US010726041B1

(12) United States Patent
Segler, Jr. et al.

(10) Patent No.: US 10,726,041 B1
(45) Date of Patent: Jul. 28, 2020

(54) MULTI-REVISION GRAPH DATA STORE

(71) Applicant: Amazon Technologies, Inc., Seattle, WA (US)

(72) Inventors: Jerry A. Segler, Jr., Lake Stevens, WA (US); Richard Julian Andrews, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 442 days.

(21) Appl. No.: 15/097,231

(22) Filed: Apr. 12, 2016

(51) Int. Cl.
| | |
|---|---|
| *G06T 11/20* | (2006.01) |
| *G06F 3/14* | (2006.01) |
| *G06F 3/0481* | (2013.01) |
| *G06F 3/0484* | (2013.01) |
| *G06F 40/166* | (2020.01) |
| *G06F 40/194* | (2020.01) |
| *G06F 40/197* | (2020.01) |
| *G06F 16/26* | (2019.01) |
| *G06F 16/248* | (2019.01) |

(52) U.S. Cl.
CPC ............ *G06F 16/26* (2019.01); *G06F 16/248* (2019.01)

(58) Field of Classification Search
CPC .................................................... G06F 40/197
See application file for complete search history.

(56) References Cited

U.S. PATENT DOCUMENTS

| | | | |
|---|---|---|---|
| 7,890,551 B2 | 2/2011 | Benelisha | |
| 2010/0211924 A1* | 8/2010 | Begel | G06F 8/74 |
| | | | 717/101 |
| 2015/0081616 A1 | 3/2015 | Kozin | |
| 2016/0110326 A1* | 4/2016 | Ryan | G06F 17/24 |
| | | | 715/255 |
| 2017/0011099 A1* | 1/2017 | Paradies | G06F 17/30554 |
| 2017/0154089 A1* | 6/2017 | Sherman | G06F 17/30572 |

\* cited by examiner

*Primary Examiner* — James Trujillo
*Assistant Examiner* — Kurt A Mueller
(74) *Attorney, Agent, or Firm* — Knobbe, Martens, Olson & Bear, LLP

(57) ABSTRACT

Systems and methods are directed to a computing device and methods for generating baselines of a data structure, such as a graph. A baseline may define a materialization of the data structure and may include pointers to a set of immutable edit revisions to the data structure that are associated with that materialization. The computing device may receive a request to change a materialization of the data structure defined by a first baseline having pointers to a first set of immutable edit revisions. The computing device may identify a second set of edit revisions to the data structure based at least in part on the requested change and the first set of immutable edit revisions. The computing device may then generate a second baseline defining a second materialization of the data structure, and the second baseline may include pointers to the second set of edit revisions.

22 Claims, 13 Drawing Sheets

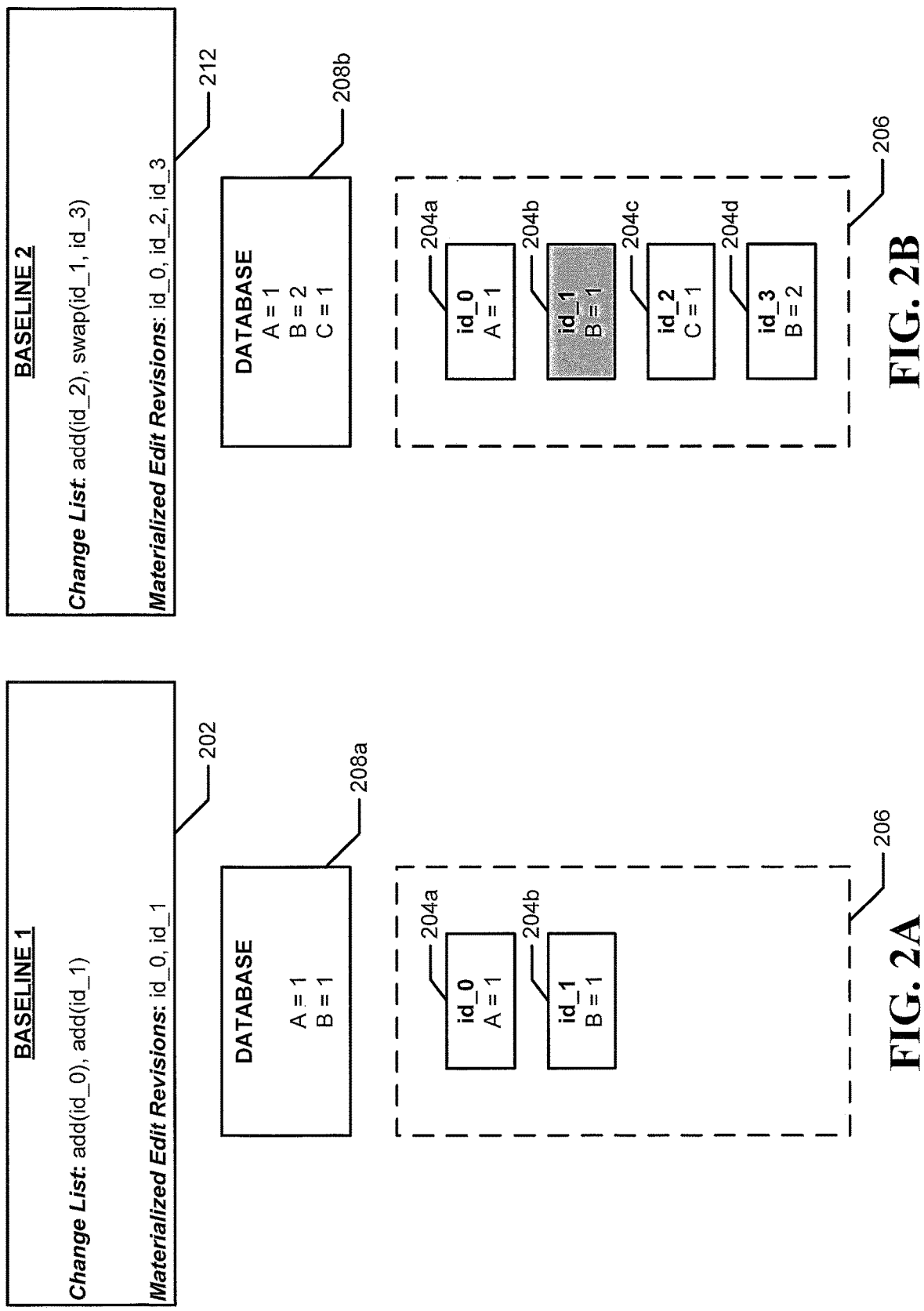

MULTI-REVISION GRAPH DATA STORE

BACKGROUND

Generally described, some systems organize catalogs of items (e.g., goods and/or services) into data structures that reflect individual properties or characteristics of the items, as well as relationships between items. For example, a system may organize a catalog of items as a graph of items and item relationships (e.g., nodes and edges between nodes), and the graph may serve as the basis of an electronic marketplace accessible by end users of the electronic marketplace via a browser application. In this example, the structure of the graph may correspond to a hierarchy of item categories and subcategories, and end users may browse the catalog of items by inspecting items included in these categories and subcategories.

A system configured to maintain a graph of items typically deploys changes to the graph as a set of interdependent changes, whereby implementing one change to the graph may affect or depend on the successful implementation of another change to the graph. Implementing these interdependent changes correctly and without compromising the integrity of the graph is often a non-trivial task because the interdependent changes typically must be applied to the graph in a particular order and at scheduled times. As such, applying some but not all interdependent changes to the graph at a prescheduled time may result in a graph that is inconsistent, broken, or otherwise impaired. As a result, a system utilizing this graph may experience significantly degraded performance, for example, because responding to user requests may be slowed due to the impaired state of the graph.

Some graphs are changed frequently and may include adding, removing, and modifying potentially thousands of items over a short period of time. Administrators of current systems generally desire the ability to implement changes to the graph quickly and without comprising the structure/integrity of the graph. Accordingly, improving the performance of a computing system for managing a graph by reducing the overall complexity and increasing the speed and flexibility of changing the graph remains a technical challenge.

BRIEF DESCRIPTION OF THE DRAWINGS

FIG. 2A is a block diagram depicting an example of a first materialization of a database data structure according to a first baseline.

FIG. 2B is a block diagram depicting an example of a second materialization of the database shown in FIG. 2A according to a second baseline.

DETAILED DESCRIPTION

Figure 1A:
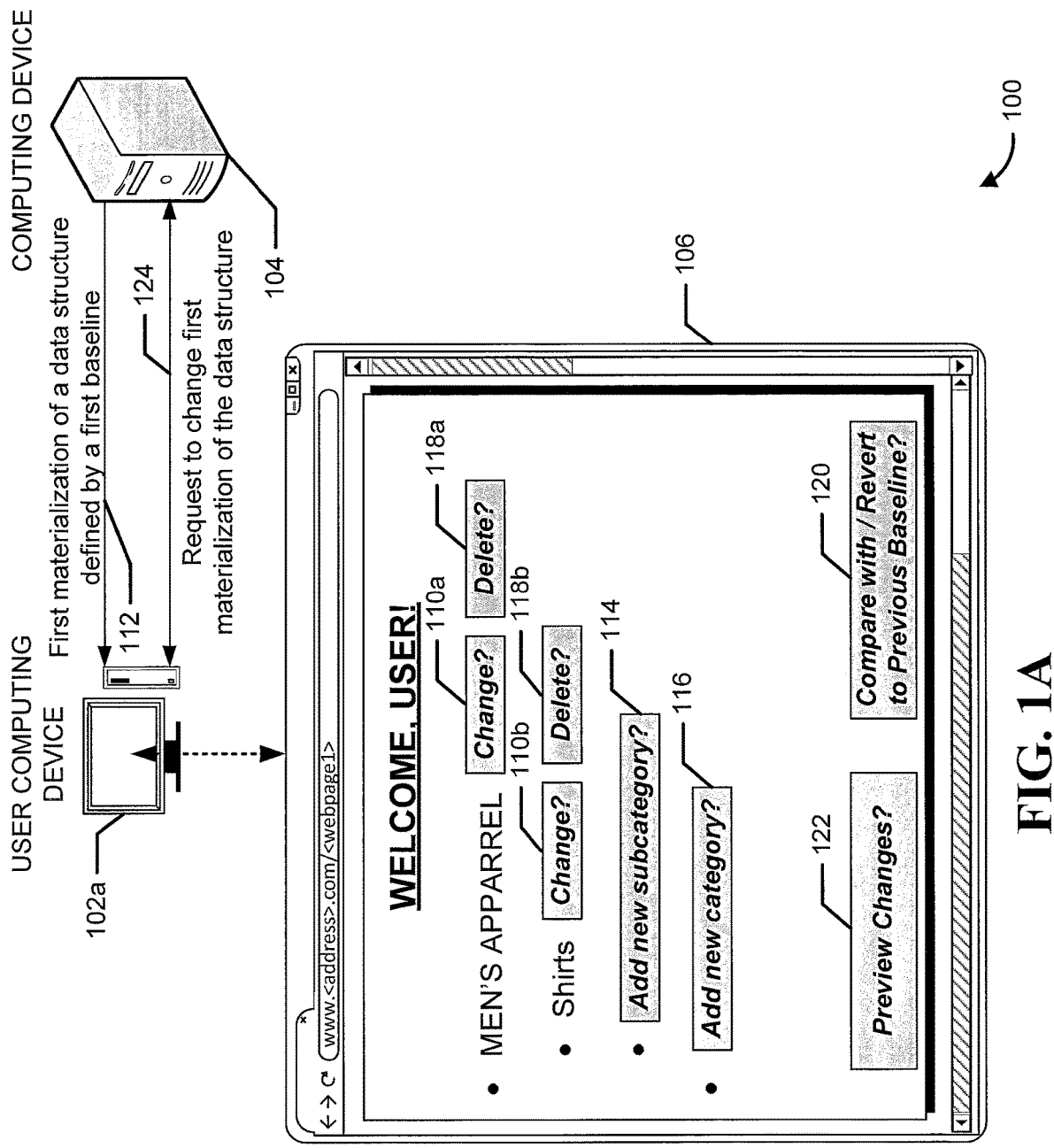
FIGS. 1A and 1B are block diagrams depicting illustrative communications exchanged between a computing device, such as a server, and a user computing device related to rendering and changing a materialization of a data structure, according to some embodiments.

Current systems typically only maintain the most current version of a graph data structure (also sometimes referred to herein as simply a "graph"). Specifically, a system may receive requests to change a component of the graph (e.g., a node, edge, or tree of the graph), and the system may change that component in response. As part of implementing the change to the graph, the system may update, remove, or add values, properties, characteristics, or other features related to components in the graph without preserving information about the previous state of the graph.

As a result of maintaining only a single version of the graph, current systems are limited to offering users (e.g., both end users that browse the graph and edit users that are authorized to modify the graph) only one view or representation of the graph—namely, the most current version of the graph. As a result, users of these systems are limited to interacting with the most current version, and the system must carefully schedule changes to the graph requested by edit users in order to avoid the introduction of an error into the graph.

In the event that an error or other undesirable change is introduced to the graph, such systems are often inflexible in their ability to resolve these problems, particularly when the graph includes a large number of items and/or a complex system of relationships between items. For example, the systems may be unable to identify the sequence of changes that produced the inconsistency or error in the graph because the systems lack information regarding previous states of the graph that did not include the inconsistency or error and may be unable to resolve the issue by reverting the graph to one of those earlier states. These limitations of some systems may especially complicate efforts to resolve inconsistencies or errors that may be discovered only after many subsequent changes have been made to the graph. For example, as a result of these errors or inconsistencies, current systems frequently experience slowed or inefficient performances while also frustrating users overall experience by providing user with "bad" data.

Further, some systems maintain multiple versions of a graph. However, in these systems, each version of a graph includes a complete copy of all of the data and other information associated with the graph. Relatively small changes between two versions of the graph may be captured and stored as two complete copies of the graph with significant overlap in data and other information. As such, these systems often require a substantial amount of memory to store different versions of the graph despite the potential for only minor changes between graph versions. Additionally, some systems (e.g., current revision control systems) efficiently store information regarding changes that are made to a graph. As a result, these systems are able to use this change information to generate versions of the graph corresponding to those changes from an original version of the graph. However, using change information to generate a version of a graph typically requires a substantial amount of time and processing resources to build that version of the graph from a chain of differences that is applied to the original version of the graph.

In overview, aspects of the present disclosure include systems and methods for managing a data structure that overcome the technical limitations of current systems (e.g., as described above) by improving the overall reliability of information provided to users, improving memory management, and reducing the overall computational complexity and memory required to modify and maintain multiple versions of data structures simultaneously or nearly simultaneously. Specifically, in some embodiments, a computing device may obtain a set of edit revisions (described further below) and may store the set of edit revisions in a shared data set. The computing device may organize these edit revisions into a data structure, such as a graph of nodes, edges between nodes, and trees. The computing device may generate and store a first baseline of the data structure that defines a first version, state, or representation of the data structure (sometimes referred to herein as a "materialization" of the data structure). The first baseline may include pointers to the edit revisions in the shared data set that make up the first materialization of the data structure, as well as other information that may be relevant to describing the first materialization of the data structure. In various embodiments, the first baseline of the data structure may serve as a memory-limited, lightweight "snapshot" of the state of the data structure at the time the baseline is generated because the first baseline may include pointers to edit revisions instead of including the actual edit revisions. At a later point in time (e.g., after one or more changes have been made to the data structure), the computing device may generate a second baseline of the data structure that defines a second materialization of the data structure. The second baseline may include pointers to the edit revisions stored in the shared data set that are represented in the second materialization of the data structure without storing those edit revisions as part of the second baseline. As will be further described herein, the computing device may utilize the information associated with the baselines of the data structure to achieve several improvements over conventional systems, including but not necessarily limited to quickly and efficiently compiling information regarding a history of changes associated with the data structure, generating comparisons of different materializations of the data structure that may be provided to users (e.g., end users or edit users), transitioning the data structure from one baseline to another (e.g., reverting the data structure to an earlier state), generating previews of an anticipated future state of the data structure, and providing different materializations of the data structure to different users for simultaneous use using comparatively fewer memory resources than current systems.

As used herein, the terms "edit revision" or "edit revision to a data structure" are used interchangeably and refer to a basic unit of information related to a data structure that may be stored in a shared data set. According to some embodiments, an edit revision to a data structure may have a unique identifier that may not be allocated to any other edit revision. An edit revision may include or otherwise indicate one or more fields, and each field may have a value. In a non-limiting example, an edit revision may have a unique identifier of "id_0," a field of "A," and a value of that field of "A=1." The unique identifier, field, and value of an edit revision may be immutable such that the unique identifier, field, and value of the field are not modified once an edit revision is created. One or more edit revisions may define or reflect structures, entities, or relationships of a data structure. For example, a set of edit revisions to a graph data structure may define characteristics of a node in a graph data structure, while another set of edit revisions to the graph data structure may define characteristics of another node in the graph data structure. In another example, a set of edit revisions may define a version of a node, and another set of edit revisions may define a different version of the same node.

The term "pointer block" is used herein to refer to an entity (e.g., a data record or the like) that includes or defines an immutable set of reusable pointers to one or more edit revisions stored in the shared data set. By way of a non-limiting example, a shared data set may include four edit revisions, a first pointer block may include pointers to two of those four edit revisions and a second pointer block may include pointers to the two other edit revisions. As used herein, the term "pointer" generally refers to any type of reference, link, pointer, or indicator to data (e.g., edit revisions or pointer block) located in internal or external memory. In an example, a pointer block may include a pointer to a memory address of an edit revision that is stored in a shared data set.

As sometimes used herein, a pointer included in a pointer block may be referred to as a "block revision." In some embodiments, a pointer block may be immutable, and the set of block revisions included in the pointer block may also be immutable. Specifically, once a pointer block is created with an initial set of block revisions, the pointer block may not be modified to add block revisions to or omit block revisions from that set of block revisions. Further, each block revision included in the set of block revisions may not be modified and may always point to the same edit revision. As a result, the set of block revisions in a pointer block may always refer to the same set of edit revisions stored in the shared data set.

As used herein, the term "data structure" refers to one of various methods of organizing edit revisions. By way of a non-limiting example, a data structure may include a graph data structure that includes nodes, edges or links between nodes, trees, and the like. In an example, the graph data structure may correspond to a catalog of items accessible or included in an electronic marketplace accessible by users of the electronic marketplace. However, a graph data structure is not limited to a graph of items in an electronic marketplace context and may include graphs of any nature in which data and the relationships between data can be stored or represented. In some embodiments, a data structure may be based on or made from a set of edit revisions that are stored in the shared data set. As such, different materializations of the data structure may be defined by or based on different sets of edit revisions. For example, one set of edit revisions may collectively define the properties, characteristics, structures, and relationships of a first materialization of a data structure, wherein another set of edit revisions may similarly define the same for a second materialization of the data structure. In some alternative (or additional) embodiments, pointers to a set of edit revisions that defines a data structure may be organized into one or more pointer blocks. Specifically, one or more pointer blocks may represent individual or collections of nodes, trees, and other structures or relationships of a data structure. By way of an example, a first pointer block may include block revisions to edit revisions that define a first node in a graph data structure, and a second pointer block may include block revisions to edit revisions that define a second node in the graph data structure. In some embodiments, multiple pointer blocks may collectively define an entity, structure, or relationship of a graph (e.g., a set of pointer blocks may collectively point to edit revisions that define a node in the graph).

As used herein, the term "baseline" refers to an immutable collection of information related to a materialization of a data structure. A baseline of a data structure may include pointers that refer directly or indirectly to a set of edit revisions stored in the shared data set. In some embodiments, a baseline may include pointers to individual edit revisions stored in the shared data set. In some alternative (or additional) embodiments, a baseline may include pointers to one or more pointer blocks, and, in turn, each of the pointer blocks may include block revisions that point to one or more edit revisions stored in the shared data set. The set of edit revisions referenced by a baseline may define or be used to create a particular materialization of the data structure. For ease of description, the edit revisions that define or are used to create a materialization of the data structure may be referred to herein as "materialized" with reference to that materialization of the data structure. As such, edit revisions stored in the shared data set that are not used to define or create a materialization of the data structure may sometimes be referred to as "non-materialized" with reference to that materialization of the data structure. Thus, an edit revision may be designated as materialized with respect to one or more materializations of a data structure, but may be designated as non-materialized with respect to one or more other materializations of the same data structure.

In some embodiments, a baseline may include pointers to pointer blocks or edit revisions that fully define a materialization of the data structure, and as such, a computing device may utilize a baseline to generate that materialization of a data structure without needing to refer to any other baseline. Further, because edit revisions are not modified, a baseline that defines a materialization of the data structure may always point to the particular subset of the edit revisions stored in the shared data set that make up that materialization of the data structure. As a result, a baseline may always point to a valid materialization of the data structure.

As used herein, the term "change command" refers to an individual change that is applied to a materialization of a data structure. Further, the term "change list" may refer to a set of one or more change commands that are applied to a materialization of a data structure in order to create another materialization of the data structure. In some embodiments, the change commands in a change list may be applied at the same or substantially the same time to transform a materialization of the data structure into another materialization of the data structure. As such, in some optional embodiments, a baseline that defines a second materialization of a data structure may include or be associated with a change list that indicates the set of change commands applied to a first materialization of the data structure to form the second materialization of the data structure.

As used herein, the term "preview" baseline generally refers to a baseline that defines a materialization of a data structure that has not been officially implemented or adopted (referred to herein as a "preview materialization"). Specifically, a preview materialization of a data structure may reflect a tentative state of the data structure according to one or more tentative changes. For example, a preview materialization of a data structure may reflect a tentative change that is scheduled to occur (e.g., to become "official") at some time in the future. In some embodiments, the computing device may generate, from a set of edit revisions, a preview baseline that defines a preview materialization, and the preview baseline may include pointers to the edit revisions in that set. Further, as used herein, the term "implemented" baseline generally refers to a baseline that defines a materialization of a data structure (e.g., an "implemented materialization") that has become an immutable record set, such as after being officially implemented or adopted. Because implemented materializations are immutable, they may be shared between computing devices or derived from a corresponding implemented baseline. In some embodiments, the computing device may generate one or more preview baselines between implemented baselines (e.g., as further described with reference to FIGS. 5 and 10).

As used herein, the term "user" may generally refer to an individual who interacts with a data structure via a user computing device. A user may include an "end user," who may be authorized to view, browse, request, and may otherwise interact with a materialization of a data structure. For example, an end user may request a materialization of a data structure in the form of a catalog of items. However, as used herein, an end user may not be authorized to request changes to the data structure. A user may also include an "edit user," who may be authorized to view, browse, request, and interact with a materialization of a data structure (e.g., like an end user) but may also be authorized to modify the data structure. By way of a non-limiting example, an edit user may correspond to a database administrator who utilizes a computing device to modify a database data structure.

In some embodiments, the computing device may utilize one or more baselines of a data structure to quickly and efficiently audit and compare the history of changes of the data structure. By comparing the pointers included in different baselines, the computing device may quickly determine the operations that were performed on the data structure, as well as the change in the edit revisions that were materialized or expressed in each baseline. In some embodiments, the computing device may also compare a current materialization of the data structure to a materialization of the data structure defined in a baseline. Based on this comparison, the computing device may quickly determine differences between the current data structure and the data structured described in the baseline. Further, the computing device may perform similar comparisons between two previously generated baselines, and these comparisons may assist in auditing the evolution of the data structure from one baseline to another baseline. In an example in which a first baseline defines a first materialization of the data structure and in which a second baseline defines a second materialization of the data structure, the computing device may quickly identify pointer blocks that are shared between the first and second baselines to determine aspects of the first and second materializations that are the same. Similarly, the computing device may identify pointer blocks that are not shared between the first baseline and the second baseline to narrow the search for aspects of the first materialization that are not present or different in the second materialization. Specifically, for the one or more pointer blocks that are not shared between the first baseline and the second baseline, the computing device may identify the block revisions that point to the same edit revisions and may identify the block revisions that do not point to the same edit revisions. The block revisions that do not point to the same edit revisions may indicate or define the difference between the first baseline and the second baseline whereas the block revisions that point to the same edit revisions may indicate aspects of the first baseline and the second baseline that are the same.

In some embodiments, the computing device may apply a change list to a data structure and may generate a baseline of the data structure following application of the change list. The computing device may determine that application of the change list has caused an error or inconsistency to occur in the data structure—such as by determining that implementing a change command has resulted in a violation of a business rule—and, in response, may compare the baseline of the data structure with an earlier baseline of the data structure to identify the edit revisions that were affected by the change list and to determine the change commands implemented to effect the change. The computing device may utilize this information to generate diagnostic information and additionally (or alternatively) to revert at least a portion of a materialization of the data structure to an earlier materialization in which the error or inconsistency is not present.

As described, the computing device may generate a baseline of the data structure that includes pointers to a set of edit revisions in the shared data set (or to pointer blocks that include a set of block revisions that point to that set of edit revisions) that are designated as materialized at the time the baseline is generated. Particularly, the baseline of the data structure may, directly or indirectly, include pointers to the edit revisions that are materialized in a materialization of the data structure at the time the baseline is generated without actually storing those edit revisions. Because edit revisions are not modified or typically removed from the shared data set, the computing device may leverage the pointers stored in a baseline to determine the precise set of edit revisions in the shared data set that formed the data structure at the time the baseline was created. As such, the computing device may utilize the baseline to analyze or even recreate the data structure described in that baseline without having to refer to any other baseline of the data structure.

As described, a first materialization of a data structure is defined by the particular set of edit revisions that is designated as materialized with respect to the first materialization. As such, the computing device may implement one or more changes (e.g., in the form of a change list) to the first materialization of a data structure by determining a different set of edit revisions that reflects those one or more changes. This different set of edit revisions may then form the basis of a second materialization of the data structure. By way of a non-limiting example, the computing device may provide the first materialization of the data structure to one or more users. The computing device may receive a request to modify the first materialization of the data structure, for example, from one or more edit users. In response, the computing device may determine whether the request corresponds to change commands for adding, omitting, or a combination of adding and omitting (sometimes referred to as "swapping") one or more edit revisions that make up the first materialization of the data structure. Because edit revisions stored in the shared data set are immutable, the computing device may implement change commands to the first materialization of the data structure by adding new records to the shared data set, if necessary, and by designating a set of edit revisions as materialized with respect to a second materialization of the data structure. For example, in order to implement a change command for adding a new edit revision, the computing device may create the new edit revision (if the new edit revision is not already stored in the shared data set), store the new edit revision in the shared data set, and designate the new edit revision as materialized with respect to the second materialization of the data structure. As described herein, a reference to a "new" edit revision may refer to an edit revision that is created and designated as materialized in response to an "add" change command or, alternatively, a preexisting edit revision included in the shared data set that is designated as materialized in response to the "add" change command. In order to implement a change command for omitting a preexisting edit revision, the computing device may leave the preexisting edit revision in the shared data set, but may designate the preexisting edit revision as non-materialized with respect to the second materialization. To implement a change command for swapping a preexisting edit revision with a new edit revision having a desired value, the computing device may leave the preexisting edit revision in the shared data set, add the new edit revision to the shared data set, designate the preexisting edit revision as non-materialized with respect to the second materialization, and designate the new edit revision as materialized with respect to the second materialization. If not affected by a change command, edit revisions designated as materialized with respect to the first materialization of the data structure may also be designated as materialized for the second materialization of the data structure.

Further, in some embodiments, a change list created for or in relation to a baseline may be applied to another baseline. By way of an example, a change list applied to a first baseline to add a node to a materialization of a graph data structure defined by the first baseline may be applied to a second baseline to add that node to a materialization of the graph data structure defined by the second baseline. In such embodiments, a change list may be applied to a baseline that is generated after the change list has been generated. By way of a non-limiting example, the computing device may apply the same change list to different derived baselines that have diverged from a common origin baseline in order to make the same changes to the materializations defined by those derived baselines.

Continuing with the above example, the computing device may generate a new baseline of the data structure that defines the second materialization of the data structure after applying the one or more change commands to the first materialization of the data structure. In such embodiments, the new baseline may include pointers to the set of edit revisions in the shared data set that are designated as materialized with respect to the second materialization of the data structure. In some optional embodiments, the new baseline may also include information about the one or more changes that the computing device implemented in order to move from the first materialization to the second materialization of the data structure (e.g., adding a new edit revision, omitting a preexisting edit revision, or swapping an edit revision having a value with another edit revision having another value). Implementing changes to a materialization of a data structure is further described (e.g., with reference to FIGS. 2A-2C, 3A-3B, and 9).

The computing device may preserve edit revisions in order to preserve the ability of a user to access previous materializations of a data structure. However, in some embodiments, the computing device may selectively remove edit revisions from the shared data set according to various data management policies. By way of an example, the computing device may implement a scheduled purge of certain edit revisions in the shared data set. Specifically, the computing device may identify edit revisions that are no longer useful or needed, such as edit revisions pointed to by block revisions included in pointer blocks or baselines generated before a certain absolute or relative time (e.g., baselines that are older than one day, one week, one month, or the like from the current date or from a fixed date or time). As such, the computing device may remove these edit revisions from the shared data set to increase available memory. Further, the computing device (or a distributed set of computing devices accessing the same shared data set) may utilize one of various schemes of assigning unique identifiers to edit revisions that ensure that no identifier is allocated to more than one edit revision. In a non-limiting example, the computing device (or set of distributed computing devices) may assign identifiers to new edit revisions sequentially.

In some embodiments in which the computing device removes one or more edit revisions from a shared data set used by the computing device, the computing device may be unable to generate a first materialization (or at least an entire materialization) of the data structure from a baseline that points to one or more of the removed edit revisions. However, in some embodiments in which the shared data set is stored or archived (e.g., on one or more other computing devices), the computing device may add copies of the one or more removed edit revisions from an archived shared data set to the shared data set used by the computing device and may generate a new baseline that includes pointers to the copies of these edit revisions. The computing device may then use the new baseline to generate a second materialization of the data structure that is the same or similar to the first materialization.

In a non-limiting technical improvement over current systems, the computing device may utilize information from previous baselines to make corrections and edits to a data structure quickly and efficiently. As noted above, current systems are either unable to revert part or all of a data structure to an earlier state of the data structure because information regarding the previous state of the data structure is not retained, or current systems are limited to reverting the entirety of the data structure to an earlier state, such as by loading an entire archived materialization of the data structure. In contrast and according to some embodiments, the computing device may utilize information regarding a change list applied to a first materialization of the data structure that yielded a second materialization of the data structure to revert portions of the second materialization of the data structure. For example, an error or inconsistency may have been introduced into the data structure when moving from the first materialization to the second materialization. However, rather than reverting the entire second materialization of the data structure to the first materialization, the computing device may identify one or more change commands associated with the error or inconsistency and selectively "undo" those change commands. As such, the computing device may strategically correct errors in the data structure without having to discard other changes that are not related to the problem. By way of an example, the computing device may apply a first change command and a second change command to a first set of edit revisions that defines a first materialization of a data structure in order to determine a second set of edit revisions that defines a second materialization of the data structure. The computing device may selectively revert the changes associated with the first change command by determining an inverse of the first change command and applying the inverse of the first change command to the second set of edit revisions. By applying the inverse of the first change command, the computing device may determine a third set of edit revisions that defines a third materialization of the data structure. As a result of "undoing" the first change command, the third materialization of the data structure may reflect only the changes associated with the second change command. As such, at least a portion of the third materialization may be substantially equivalent to a portion of the first materialization, and at least another portion of the third materialization may be substantially equivalent to a portion of the second materialization. Selectively editing materializations of a data structure are further described herein (e.g., with reference to FIGS. 6 and 11).

Another non-limiting technical improvement over current systems is that the computing device may simultaneously or nearly simultaneously provide different materializations of the data structure to different users, according to some embodiments. By way of a non-limiting example, the computing device may use the same baseline (e.g., the "origin" baseline) to create two different baselines (e.g., "derived" baselines). As such, the computing device may utilize a first derived baseline to provide a first derived materialization of the data structure to some users and may use the second derived baseline to provide a second materialization of the data structure to other users. Further, because the edit revisions in the shared data set remain valid, the origin baseline of the data structure remains valid and, as such, the computing device may provide a materialization of the data structure defined by the origin baseline to users while also providing the first and second derived materializations of the data structure at the same or substantially the same time.

In some embodiments, the computing device may utilize baselines to analyze effects of propagating alternative changes to the data structure. Specifically, the computing device may identify an origin baseline and a sequence of derived baselines originating with the origin baseline. For example, the computing device may identify the origin baseline, a first derived baseline that is derived from the origin baseline, a second derived baseline that is derived from the first derived baseline, and so on. The computing device may determine how the sequence of baselines would be affected by modifying the change lists for one or more baselines in the sequence. For example, the computing device may use the sequence of baselines as a template and may generate an alternative sequence of baselines, wherein one or more change lists of one or more of the baselines of the alternative sequence of baselines differ from the corresponding change lists of one or more of the baselines of the sequence of baselines.

In some embodiments, because baselines do not include the immutable edit revisions stored in the shared data set and instead include pointers or links to those edit revisions, the computing device may simultaneously or nearly simultaneously provide different materializations of a data structure to one or more user computing devices without having to make copies of the edit revisions in the shared data set. In other words, according to some embodiments, different materializations of a data structure may reference the same immutable edit revision without requiring a separate copy of that edit revision for each materialization, thereby achieving significantly less memory usage than current systems that generate separate copies of edit revisions for each materialization of a data structure, even in the event that those materializations are only slightly different. Further, in some embodiments in which the computing device is included in a set of distributed computing devices, each of the set of computing devices may take a separate copy of the shared data set because the edit revisions in the copies of the shared data set may remain valid regardless of changes that may occur at different computing devices within the set. As a result, each of the computing devices may provide valid materializations of the data structure to users without synchronizing or communicating with other computing devices. Further, each computing device in the set may independently respond to requests from users to provide or modify materializations of the data structure according to various baselines.

Additionally, in some embodiments, the computing device may generate previews of materializations of a data structure. In such embodiments, a preview baseline may include pointers to one or more edit revisions related to anticipated changes to be made to a first implemented materialization of the data structure defined by a first implemented baseline. In an example, the computing device may receive, from a first edit user, a request to change a portion of the first implemented materialization of the data structure at a point of time in the future. In response, the computing device may generate a preview materialization of the data structure corresponding to the request and may generate a corresponding preview baseline that includes pointers to the edit revisions that would be designated as materialized when the requested change is implemented at the indicated future time. Accordingly, the computing device may provide the preview materialization of the data structure to other edit users to enable those edit users to "preview" what a materialization of the data structure will look like before or after one or more of the changes are applied. As a result, other edit users may be able to view the preview materialization of the data structure and may request additional changes to the preview materialization of the data structure. Continuing with the above example, the computing device may provide a second edit user with the preview materialization of the data structure as defined by the preview baseline, and the second edit user may request another change to the preview materialization of the data structure. In some embodiments, the computing device may implement the scheduled changes at corresponding times and may generate an implemented baseline of the data structure that defines a second implemented materialization of the data structure. In some embodiments, the implemented baseline may also include information regarding the changes between the first implemented materialization and the second implemented materialization of the data structure. While the above description refers to edit users, in some embodiments, there may be no need for a user to be an edit user or to have elevated privileges to construct a preview materialization of a data structure. Specifically, in such embodiments, the computing device may receive a request to create or modify a preview materialization of a data structure from any user. In some embodiments, the computing device may not store edit revisions associated with a preview materialization of a data structure, and as a result, the computing device may merely utilize unique identifiers allocated to those revisions. In some embodiments, the computing device may allocate unique identifiers from a private or separate pool of unique identifiers to edit revisions related to preview materializations. Generating preview baselines and preview materializations of a data structure are further described (e.g., with reference to FIGS. 5 and 10).

The various embodiments will be described in detail with reference to the accompanying drawings. Wherever possible, the same reference numbers will be used throughout the drawings to refer to the same or like parts. References made to the particular examples and implementations are for illustrative purposes, and are not intended to limit the scope of the invention or the claims.

Figure 1B:
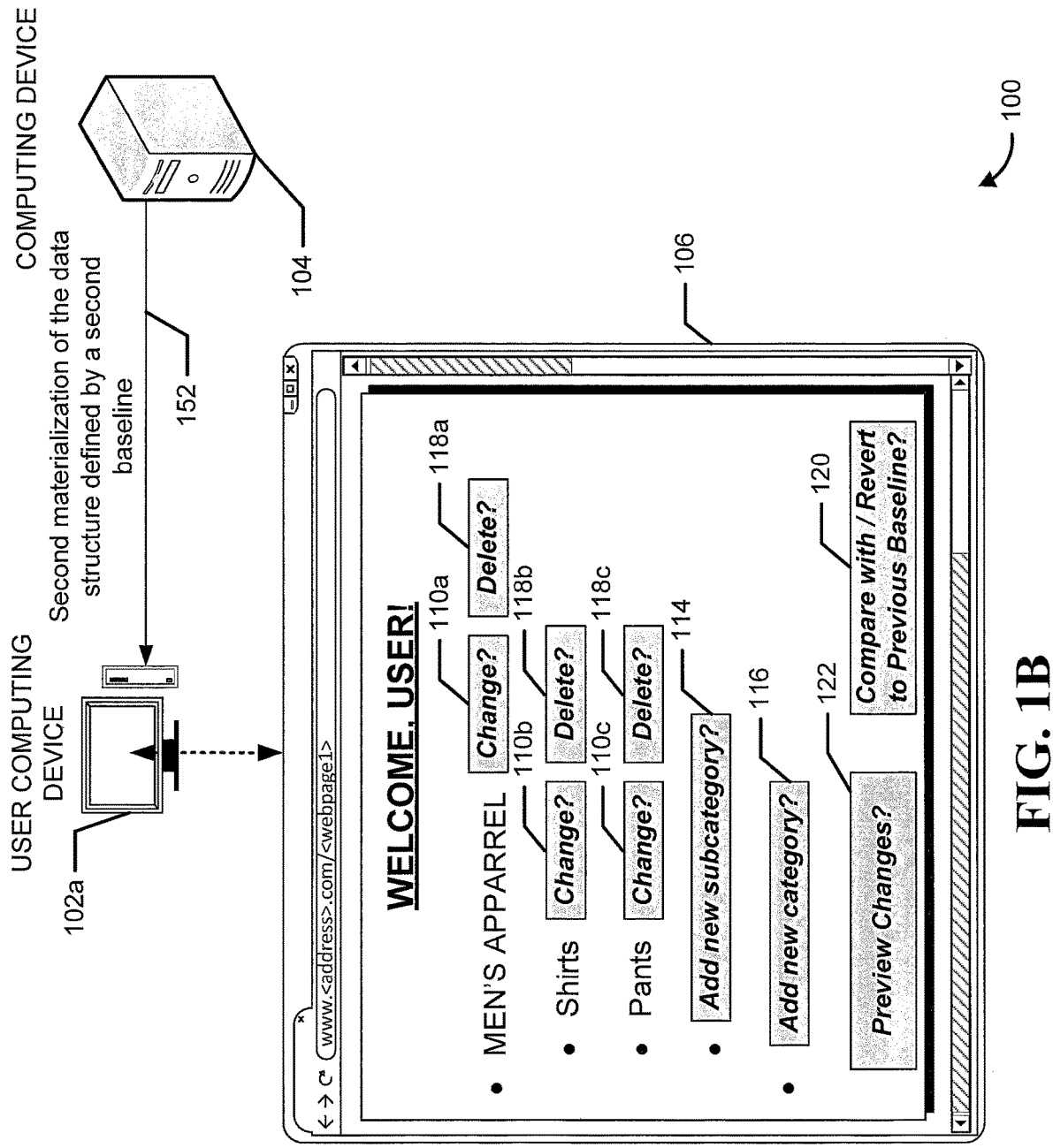

FIGS. 1A and 1B are block diagrams of an illustrative system 100 suitable for implementing some aspects of the present disclosure. The system 100 may include a user computing device 102a. While illustrated in FIGS. 1A and 1B as a desktop or personal computer, those skilled in the art will recognize that the user computing device 102a may be any of a number of computing devices that are capable of communicating over a network and capable of requesting and rendering network page (e.g., web page) data from network content providers. Such computing devices may include, but are not limited to, laptop computers, personal computers, personal digital assistants (PDA), hybrid PDAs/mobile phones, mobile phones, smartphones, wearable computing devices, electronic book readers, digital media players, tablet computer, gaming console or controller, kiosk, augmented reality devices, other wireless devices, set-top or other television boxes, and the like. For example, the user computing device 102a may be a smartphone configured with a browser application that enables the user computing device 102a to request and display network pages.

In the examples illustrated in FIGS. 1A and 1B, the user computing device 102a may be utilized by an edit user that may desire to view or change a materialization of a data structure. The user computing device 102a may be in communication with a computing device 104 via one or more network communication links (e.g., as described with reference to FIG. 7). For example, the user computing device 102a may establish a network communication link 112 with the computing device 104. This communication link 112 may correspond with following a network address link to a network location of the computing device 104. Via the network communication link 112, the user computing device 102a may receive, from the computing device 104, a first materialization of a data structure defined by a first baseline of the data structure. In some embodiments, the user computing device 102a may send a request to the computing device 104 for a materialization of the data structure defined by a particular baseline.

While the illustrated examples described with reference to FIGS. 1A and 1B depict one user computing device 102a, one or more additional user computing devices may also be in communication with the computing device 104. Thus, in such embodiments, multiple user computing devices may send requests to the computing device 104 to view and/or modify one or more materializations of the data structure. In order to handle requests to view or change a materialization of a data structure, the computing device 104 may generate one or more baselines that include pointers to edit revisions that make up one or more materializations of the data structure. Since the computing device 104 generates baselines using immutable edit revisions that remain valid regardless of future changes to the data structure, the computing device 104 may accommodate change requests from multiple user computing devices, as further described herein.

In some embodiments, the computing device 104 may generate the first materialization of the data structure in response to receiving a request from the user computing device 102a. In some embodiments, the computing device 104 may prepare the first materialization of the data structure in a form suitable for viewing on a display or user interface of the user computing device (e.g., the display 106). As such, the first materialization of the data structure may be prepared as a network page, an image, or the like. In the example illustrated in FIG. 1A, the computing device 104 may prepare the first materialization of a graph data structure for display on a browser as a hierarchy of apparel categories. The computing device 104 may provide the user computing device 102a with the materialization of a data structure via the communication link 112. In response, the user computing device 102a may begin rendering the first materialization of the data structure on the display 106 of the user computing device 102a.

In the example illustrated in FIG. 1A, the first materialization of the data structure presented on the display 106 may also include interactive elements that the edit user of the user computing device 102a may select in order to send a request 124 to change the first materialization of the data structure. Specifically, the first materialization of the data structure presented on the display 106 may include submit buttons or other interactive elements that may enable the edit user of the user computing device 102a to change or delete the elements in the hierarchy of apparel categories or to add new categories or subcategories to the hierarchy. In the illustrated example, the first materialization of the data structure may include change submit buttons 110a and 110b that the edit user of the user computing device 102a may select in order to change the adjacent element of the data structure materialization. For example, the edit user of the user computing device 102a may select change submit button 110b in order to change the "Shirts" subcategory (e.g., by changing the name of the subcategory or some other aspect of that category). The first materialization of the data structure may also include delete submit buttons 118a and 118b that, when selected, may send a request to the computing device 104 to delete those elements from the data structure. The first materialization of the data structure may further include one or more add submit buttons, such as the add-new-subcategory submit button 114, which corresponds to a request to add a new subcategory to the data structure, and the add-new-category submit button 116, which corresponds to a request to add a new high-level category to the data structure.

In some embodiments, the first materialization of the data structure presented on the display 106 may include additional submit buttons. For example, the display 106 may present a preview-changes submit button 122 that may enable the edit user of the user computing device 102a to request tentative changes to the first materialization of the data structure. The user computing device 102a may send the tentative changes to the computing device 104 (not shown). The computing device 104 may track the tentative changes from multiple edit users and may provide these edit users with a prospective/preview materialization of the data structure according to one or more preview baselines. Generating preview baselines of a data structure is described further with reference to FIGS. 5 and 10.

In some embodiments, the display 106 may present a comparison/reversion submit button 122 that may enable the edit user of the user computing device 102a to view materializations of the data structure according to previous baselines and may enable the edit user to selectively revert portions of the data structure to earlier materializations or to compare different materializations of the data structure. Selectively reverting a portion of a data structure to an earlier materialization is further described below with reference to FIGS. 6 and 11.

Once the edit user has decided on a change to make to the first materialization of the data structure (e.g., by selecting one of the submit buttons presented on the display 106), the user computing device 102a may send the request 124 corresponding to the edit user's desired change to the computing device 104. The request 124 may indicate the components of the data structure (e.g., the nodes, edges, and trees of a graph or individual edit revisions) and the desired change to those components, such as new values, names, or the like for those components. In some embodiments (not shown), the computing device 104 may implement the requested changes in response to receiving the request 124 from the user computing device 102a. For example, the computing device 104 may add, change, or remove components from the first materialization of the data structure and may generate a second baseline of the data structure to reflect those changes to the first materialization of the data structure.

With reference to FIG. 1B, the computing device 104 may send a second materialization of the data structure defined by the second baseline to the user computing device 102a, such as via a communication link 152. In the example illustrated in FIG. 1B, the second materialization of the data structure according to the second baseline may correspond to a request to add a "Pants" subcategory under the "MEN'S APPAREL" category. In this example, the second materialization of the data structure may also include additional submit buttons 110c and 118c that may further enable the edit user of the user computing device to request changes to the new "Pants" subcategory component. As such, the user computing device 102a and the computing device 104 may engage in further request/response operations as described above.

While the above descriptions discuss remotely sending materializations of a data structure from the computing device 104 to the user computing device 102a, in some embodiments (not shown), the computing device 104 may present the materialization of the data structure locally and may receive local user inputs directed to changing one or more aspects of the data structure. In response to the local user inputs, the computing device 104 may modify materializations of the data structure, generate new baselines of the modified data structure that define the modified materializations, and present one or more modified materializations of the data structure on the local display.

FIGS. 2A and 2B illustrate component block diagrams of materializations of data structures defined by different baselines. As described above, each of the edit revisions may represent an immutable piece of information from which the computing device 104 populates or creates a materialization of the data structure. In some embodiments, each of the edit revisions may include a unique reference identifier, which, for example, may be allocated sequentially or allocated from a predetermined range of reference identifiers that may be allocated out of order. Further, each of the edit revisions may include or correspond to an initial value that is not changed (e.g., an immutable value).

The example illustrated in FIG. 2A shows the shared data set 206 and a first materialization of a database data structure (e.g., the first database materialization 208a) as defined by a first baseline 202 of the database data structure. The computing device 104 may have added edit revisions 204a and 204b to the shared data set 206, such as in response to a request to add these edit revisions 204a, and 204b to a previous materialization of the database (not shown). For example, the edit revision 204a may include a reference identifier "id_0" and may include or be associated with a field and value of "A=1." Similarly, the edit revision 204b may be associated with a reference identifier "id_1" and a field and value of "B=1."

The computing device 104 may generate the first database materialization 208a from the edit revision 204a and the edit revision 204b. In the illustrated example, the data structure 208 may be a database, and the computing device 104 may populate the database with the values of the edit revisions 204a and 204b. The computing device 104 may also generate a first baseline 202 that defines the first database materialization 208a. In some optional embodiments, a baseline may include information regarding the changes that the computing device 104 implemented to create a materialization of the data structure from another materialization of the data structure. Accordingly and as illustrated in FIG. 2A, the first baseline 202 may indicate that edit revisions 204a and 204b (as indicated by their respective reference identifiers) were included in the first database materialization 208a. The first baseline 202 may also indicate that the edit revisions 204a and 204b were used to form the first database materialization 208a by designating the edit revisions 204a and 204b as materialized.

In some embodiments, the information regarding the changes implemented by the computing device 104 may include the change commands or change list that were applied in order to generate the first database materialization 208a. For example, the computing device 104 may have received requests to add the edit revision 204a to the data structure and, in response, may have performed the change command "add(id_0)." In performing the change command "add(id_0)," the computing device 104 may have added the edit revision 204a to the shared data set 206 and may have designated the edit revision 204a as materialized with respect to the first database materialization 208a. The computing device 104 may have similarly added the edit revision 204b by performing the change command "add(id_1)" and designated the edit revision 204b as materialized with respect to the first database materialization 208a.

The example illustrated in FIG. 2B depicts the shared data set 206 and a second database materialization 208b as defined by the second baseline 252. As depicted, the computing device 104 may have generated the second baseline 212 subsequent to generating the first baseline 202. For example, the computing device 104 may have responded to one or more user requests (e.g., from one or more edit users) to change the first database materialization 208a. Specifically, as illustrated, the computing device 104 may have changed the first database materialization 208a by performing the change command "add(id_2)," which may correspond to adding a new edit revision 204c to the shared data set 206 and designating the new edit revision 204c as materialized with respect to the second database materialization 208b. As described above, because the edit revision 204c is designated as materialized, the computing device 104 may utilize the edit revision 204c as part of the second database materialization 208b. The computing device 104 may have also performed the change command "swap(id_1, id_3)," which may correspond to operations for swapping the preexisting edit revision 204b having a value of "B=1" with a new edit revision 204d (e.g., id_3) having a desired value of "B=2." In some embodiments, because edit revisions are immutable, the computing device 104 may perform a "swap" change command by performing an "omit" change command in combination with an "add" change command. In performing the change command "swap(id_1, id_3)," the computing device 104 may perform an "add" change command to add a new edit revision 204d (e.g., id_3) that has a desired value to the shared data set 206. Specifically, the computing device 104 may create the new edit revision 204d and may assign the new edit revision a value of "B=2." The computing device 104 may then store the new edit revision 204d in the shared data set 206, incorporate the new edit revision 204d into the second database materialization 208b (e.g., by replacing the value "B=1" with the value "B=2" in the database), and designate the new edit revision 204d as materialized with respect to the second database materialization 208b, such as by adding a pointer to the new edit revision 204d into the second baseline 212. The computing device 104 may further perform an "omit" change command as part of the "swap" change command by designating the edit revision 204b as not materialized with respect to the second database materialization 208b (indicated in FIG. 2B via shading), such as by omitting a pointer to the new edit revision 204d from the second baseline 212.

In some optional embodiments, the computing device 104 may generate the second baseline 252 to include information regarding the change commands or change list that the computing device 104 performed to move the data structure from the state reflected in the first baseline 202 (e.g., the first database materialization 208a) to the new state of the data structure (e.g., the second database materialization 208b). Specifically, the second baseline 252 may include information indicating that the computing device 104 performed "add" and "swap" change commands, as well as the edit revisions that were affected by these change commands. Further, the second baseline 252 may include information indicating the edit revisions stored in the shared data set 206 that are represented in the second database materialization 208b (e.g., the edit revisions that are designated as materialized with respect to the second database materialization 208b). Because the second baseline 252 includes the change list performed by the computing device 104 and information regarding the materialized records represented in the database materialization 208b, the computing device 104 may quickly evaluate differences between states of the data structure (e.g., a comparison of the database materializations 208a and 208b), which may decrease the amount of time required to identify a change to the data structure that introduced an error or inconsistency that is not desired.

As described, a change list may include information regarding a set of change commands that the computing device 104 performed to move the data structure from a first baseline to a second baseline. Because all of the change commands may be implemented as one of an "add" change command, an "omit" change command, or a combination of "add" and "remove" change commands (e.g., a "swap" change command), the change list may be guaranteed to be reversible. Specifically, computing device 104 may perform the inverse of each of change commands in the change list to "undo" or reverse the changes. For example, the computing device 104 may reverse an "add" change command by performing an "omit" change command. The computing device 104 may reverse an "omit" change command by performing an "add" change command. Similarly, because a "swap" change command is a combination of an "add" change command and an "omit" change command, the computing device 104 may reverse a "swap" change command by individually reversing the "add" and "remove" change commands.

Figure 2C:
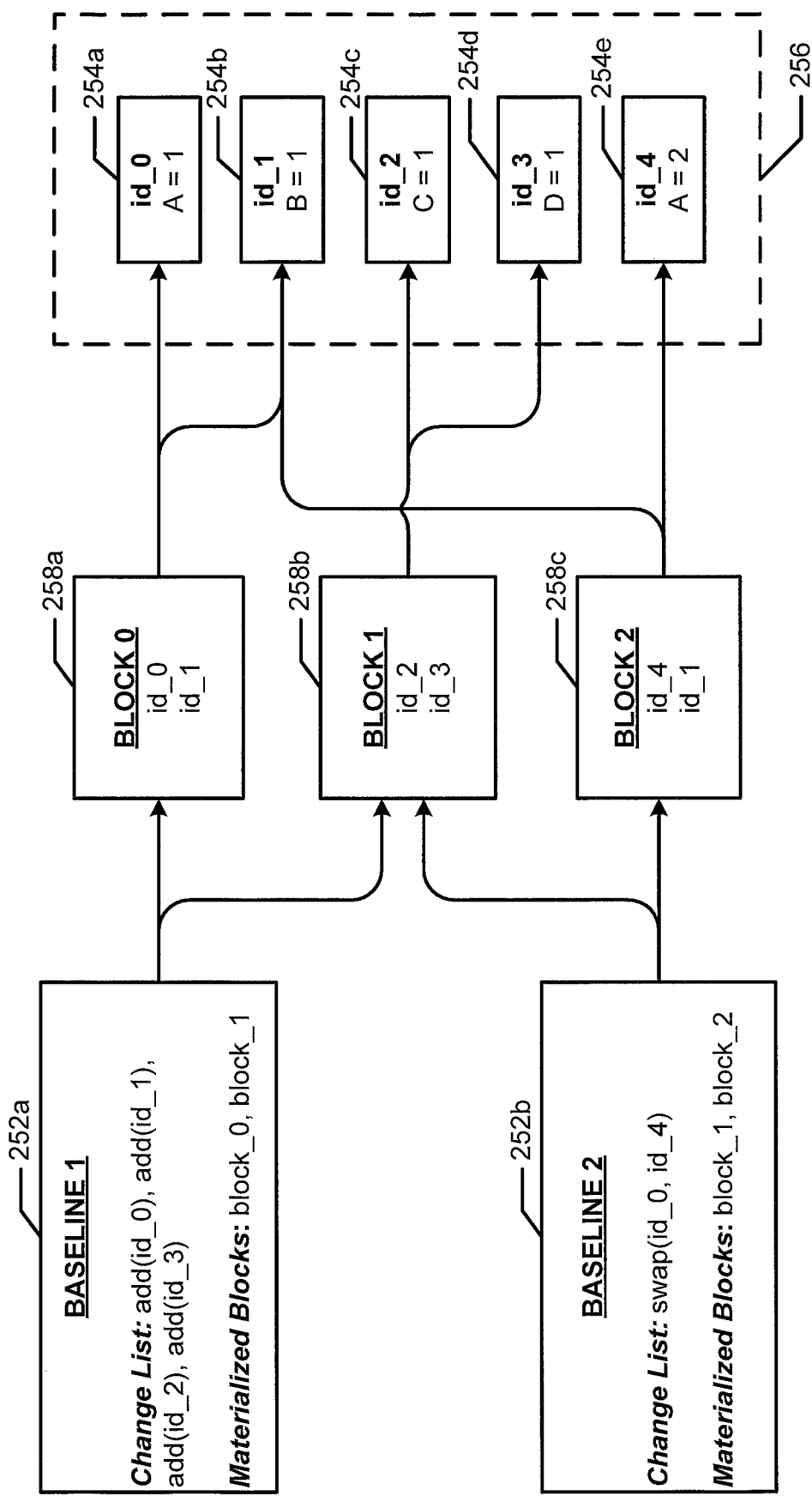
FIG. 2C is a block diagram depicting baselines that include references to pointer blocks, which in turn include references to individual edit revisions.

FIG. 2C illustrates a component block diagram of baselines of a data structure that include pointers to pointer blocks. In some embodiments (e.g., as described with reference to FIGS. 2A and 2B), edit revisions may be stored individually in a shared data set. As such, changes to a data structure may be made at the individual edit-revision level. However, in some embodiments, the computing device 104 may organize edit revisions together into related groups. The edit revisions may be related, such as by a common association to a component in the data structure (e.g., edit revisions associated with the same node, edge, tree, or the like). In such embodiments, one or more pointer blocks may include pointers to a group of edit revisions, and a baseline may include pointers to one or more pointer block.

In the example illustrated in FIG. 2C, a first baseline 252a may include pointers to a first pointer block 258a and a second pointer block 258b. The first pointer block 258a may include block revisions that point to edit revisions 254a and 254b in the shared data set 256. The second pointer block 258b may include block revisions that point to edit revisions 254c and 254d. As such, a materialization defined by the first baseline 252a (not shown) may be based on, defined by, or otherwise made from the edit revisions 254a-254d.

As described above, a pointer block may be immutable in the sense that the set of block revisions included in the pointer block may not be modified, such as by adding or omitting a block revision from the set of block revisions or by changing the edit revision to which a block revision points. Thus, when a materialization designation of an edit revision pointed to by a preexisting pointer block changes, the computing device 104 may need to create a new pointer block to reflect that change. In a non-limiting example, the new pointer block may include one or more new block revisions that point to one or more new or different edit revisions, the new pointer block may omit one or more block revisions included in the preexisting pointer block from the new pointer block, or both. In some instances, in creating the new pointer block, the computing device 104 may include copies of block revisions from the preexisting block that were not affected by the change. As such, the new pointer block may include copies of one or more block revisions from the preexisting pointer block that point to the same edit revisions as the original block revisions included in the preexisting pointer block.

In the example illustrated in FIG. 2C, the computing device 104 may, in moving from the first baseline 252a to a second baseline 252b, perform a "swap" change command to replace the edit revision 254a (e.g., "A=1") with an edit revision that has a desired value (e.g. "A=2"). As part of performing the "swap" change command, the computing device 104 may add an edit revision 254e to the shared data set 256, wherein the edit revision 254e may include the desired value (e.g., "A=2"). The first pointer block 258a points to the edit revisions 254a and 254b. Thus, in light of the "swap" change command, the computing device 104 may then create a new, third pointer block 258c that includes a pointer to the edit revision 254e and a copy of the pointer to the edit revision 254b.

The computing device 104 may then generate a second baseline 252b that includes pointers to the second pointer block 258b and the third pointer block 258c. As illustrated, the first baseline 252a and the second baseline 252b may both include pointers to the second pointer block 258b as the edit revision 254c and 254d pointed to by the second pointer block 258b are designated as materialized in both the first baseline 252a and the second baseline 252b. In some embodiments, the computing device 104 may need to create fewer new pointer blocks and block revisions because baselines may share pointers to one or more of the same pointer blocks.

Figures 3A, 3B:
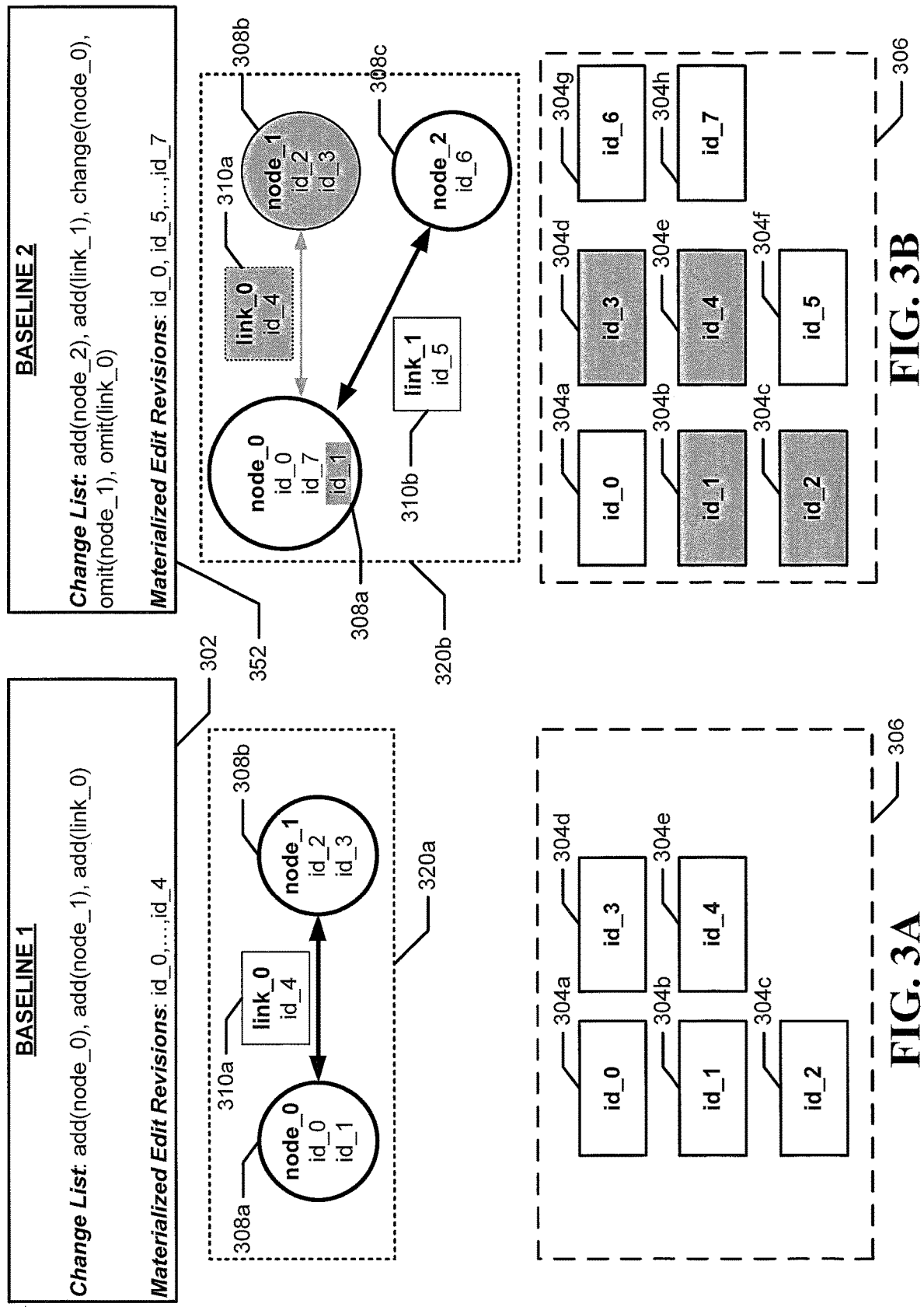
FIG. 3A is a block diagram depicting an example of a first materialization of a graph data structure that includes immutable edit revisions, according to a first baseline.
FIG. 3B is a block diagram depicting an example of a second materialization of the graph data structure shown in FIG. 3A, according to a second baseline.

FIGS. 3A and 3B illustrate materializations of a graph data structure defined by different baselines. In the examples described above with reference to FIGS. 2A and 2B, the computing device 104 receives requests to change individual edit revisions. In response, the computing device 104 added or removed individual edit revisions from data structure 208 by performing "add," "remove," or "swap" change commands. However, in some embodiments described further herein, the computing device 104 may additionally (or alternatively) receive requests to perform change commands related to sets of edit revisions that, collectively, may form or define a portion of the data structure.

Specifically, in the example illustrated in FIG. 3A, the computing device 104 may receive requests to form a first materialization of a graph data structure (e.g., a first graph materialization 320a) having two nodes and a link between those nodes. In response, the computing device 104 may perform the change command "add(node_0)" to include a first node 308a in the first graph materialization 320a. In this example, the first node 308a may be defined by or characterized by an edit revision 304a having a reference identifier "id_0" and an edit revision 304b having a reference identifier "id_1." As part of including the first node 308a in the first graph materialization 320a, the computing device 104 may add the edit revisions 304a and 304b to the shared data set 306 and may designate those edit revisions 304a and 304b in the first baseline 302 as materialized with respect to the first graph materialization 320a.

In some embodiments, a request to include the first node 308a in the first graph materialization 320a may include information indicating the types or values of edit revisions desired or required to form the first node 308a. Additionally (or alternatively), the computing device 104 may reference various types of information (e.g., templates) stored in the shared data set 306 or other organizational information that may describe the makeup or characteristics of individual components of the graph data structure 320. Based on this information, the computing device 104 may, for example, determine the number, type, and value of edit revisions that may be required to create an individual entity of the graph data structure (e.g., the types of edit revisions required to create a node or an edge between nodes).

The computing device 104 may also perform the change command "add(node_1)" in order to include the second node 308b in the first graph materialization 320a. Specifically, in order to add the second node 308b, the computing device 104 may create and store the edit revisions 304c and 304d in the shared data set 306. The computing device 104 may then utilize the edit revisions 304c and 304d to create or define the second node 308b. As the edit revisions 304c and 304d are represented in the data structure 320, the computing device 104 may designate the edit revisions 304c and 304d as materialized in the first baseline 302.

Continuing with the example illustrated in FIG. 3A, the computing device 104 may perform the change command "add(link_0)" in order to include the first link 310a in first graph materialization 320a. In particular, the computing device 104 may add the edit revision 304e to the shared data set 306 and may designate the edit revision 304e as materialized in the first baseline 302. In some embodiments, the edit revision 304e of the link 310a may include information defining or describing the first link 310a, such as information indicating that the first link 310a represents a relationship between the first node 308a and the second node 308b.

Similarly to as described above (e.g., with reference to FIGS. 2A and 2B), the computing device 104 may generate the first baseline 302 of the data structure 320 to reflect the inclusion of the first node 308a, the second node 308b, and the first link 310a in the first graph materialization 320a. In some optional embodiments, the first baseline 302 may include information related to the change list that the computing device 104 implemented to create the first graph materialization 320a. In the example illustrated in FIG. 3A, the first baseline 302 may indicate a change from no entities in the graph data structure to the inclusion of the first node 308a, the second node 308b, and the first link 310a as part of the first graph materialization 320a. As such, the first baseline 302 may indicate that the computing device 104 performed operations to add those entities to the first graph materialization 320a. Further, as described above, the computing device 104 may generate pointers included in the first baseline 302 that point to the edit revisions in the shared data set 306 that are represented in the first graph materialization 320a at the time the first baseline 302 was generated. As such, in the illustrated example, the first baseline 302 may include pointers to the edit revisions 304a-304e as they are represented in or define the first node 308a, the second node 308b, or the first link 310a in the first graph materialization 320a.

FIG. 3B illustrates an example of a second baseline 352 that indicates changes the computing device 104 made to the first graph materialization 320a and the shared data set 306 after generating the first baseline 302. Particularly, the computing device 104 may have received requests from a user computing device to change the first graph materialization 320a, such as by omitting the second node 308b and adding a third node 308c connected to the first node 308a. In response to these requests, the computing device 104 may have performed the change command "add(node_2)" to add the edit revision 304g to the shared data set and may have included the third node 308 in the second graph materialization 320b based at least in part on the edit revision 304g. For example, the edit revision 304g may include one or more values that define, describe, or characterize the properties of the third node 308c. The computing device 104 may have also performed the change command "add(link_1)," which may have included adding the edit revision 304f to the shared data set 306 and utilizing the edit revision 304f to include the second link 310b in the second graph materialization 320b.

Further, the computing device 104 may perform the change command "change(node_0)" in order to reflect the new relationship between the first node 308a and the third node 308c. As described above (e.g., with reference to FIG. 3A), the first node 308a may be associated with the edit revisions 304a and 304b. As a consequence of performing the change command "change(node_0)", the computing device 104 may need to swap the edit revision 304a with another edit revision to reflect the relationship between the first node 308a and the third node 308c. As such, the computing device 104 may add a new edit revision 304h having a desired value to the shared data set 306 and may no longer utilize the edit revision 304b in the graph data structure 320.

The computing device 104 may further perform the change command "omit(node_1)" to remove the second node 308b from the graph data structure 320. In some embodiments, the computing device 104 may remove an entity from a data structure (e.g., nodes, links or edges, trees, etc.) by designating each of the edit revisions associated with that entity as not materialized in the corresponding materialization. As such, in the example illustrated in FIG. 3B, the computing device 104 may remove the second node 308b from the second graph materialization 320b by designating the edit revisions 304c and 304d that are associated with the second node 308b as not materialized. Similarly, the computing device 104 may remove the first link 310a from the second graph materialization 320b by designating the edit revision 304e as not materialized. Thus, according to the embodiments described above, entities in the graph that are not associated with at least one edit revision designated as materialized may be effectively removed from the second graph materialization 320b.

In response to performing the change commands described above, the computing device 104 may generate a second baseline 352 of the graph data structure 320. As described above, the second baseline 352 may, in some optional embodiments, include information regarding the operations or commands the computing device 104 performed to change the graph data structure when compared to the first baseline 302 of the graph data structure 320. In the example illustrated in FIG. 3B, the computing device 104 may include information indicating or describing the change commands "add(node_2)," "add(link_1)", "change (node_0)," "omit(node_1)", and "omit(link_0)," as discussed above. In some embodiments, the computing device 104 may include information limited to the operations performed on the entities of the graph data structure 320, such as the operations performed at the node, edge, and tree level of organization. In alternative (or additional) embodiments, the computing device 104 may include information related to the changes to the individual edit revisions included in the shared data set 306. For ease of description, the computing device 104 is described as performing change command with reference to nodes and links in the graph data structure 320 (e.g., "change (node_0)," "add(node_2)," or "omit(link_1)). However, a change command applied to a node or link may correspond to one or more "add" or "omit" change commands that affect the edit revisions associated with the node or link. For example, the change command "omit(node_1")) may correspond to change commands "omit (id_2)" and "omit(id_3)." In another example, the change command "change(node_0)" may correspond to the change commands "omit(id_1)" and "(add(id_7)." As such, the computing device 104 may perform one or more change commands with reference to edit revisions in order to add, remove, or change a node or link of the graph data structure 320.

As described, the computing device 104 may continually add additional edit revisions to a shared data set and may not change values of the edit revisions stored in the shared data set. As a result, more than one baseline of a data structure may be available for use by users simultaneously. For example, an end user may request a data structure corresponding to one baseline at the same time that another end user requests a different baseline of the data structure because the edit revisions that comprise these baselines are always available in the shared data set. In another example, an edit user may request a change to a materialization of the data structure at the same or nearly the same time that another edit user requests a change to the same (or potentially a different) materialization of the data structure. Specifically, the computing device 104 may utilize the pointers stored in a baseline regarding the materialized edit revisions associated with that baseline to recreate the baseline of the data structure.

According to some embodiments, the computing device 104 may selectively remove edit revisions from the shared data set 306. Specifically, the computing device 104 may attempt to increase available space in the shared data set 306 by removing edit revisions that are no longer needed, wanted, or useful. In the examples illustrated in FIGS. 3A and 3B, the computing device 104 may determine that edit revisions associated with the first baseline 302 are not needed because the first baseline 302 was generated more than a threshold amount of time ago (e.g., the first baseline 302 is deemed "old" or "stale"). In response to determining that the first baseline 302 is no longer needed, the computing device 104 may identify edit revisions in the shared data set 306 that are associated with the first baseline 302 and that may be removed or deleted from the shared data set 306 without impacting another baseline, such as the second baseline 352. Thus, in the example illustrated in FIG. 3B, the computing device 104 may determine that the edit revisions 304b-304e are associated with the first baseline 302 and may be removed from the shared data set 306 because those edit revisions 304b-304e are not associated with the second baseline 352. In contrast, the computing device 104 may determine that edit revision 304a is associated with the first baseline 302 but that that edit revision 304a should not be removed from the shared data set 306 because the edit revision 304a is associated with the second baseline 352. Thus, in some embodiments, the computing device 104 may occasionally (e.g., periodically, based on a schedule, or in response to a request) purge, remove, or delete edit revisions associated with unwanted baselines from the shared data set 306.

In some embodiments, the computing device 104 may alternatively (or additionally) determine to remove edit revisions from the shared data set based on various other data-retention policies that may or may not be based on an amount of time that has elapsed, as described above. Some non-limiting examples of these data-retention policies may include priority-based polices, usage-based polices, or the like. By way of a specific non-limiting example, the computing device 104 may associate priorities with different baselines (e.g., a "high priority" baseline versus a "low priority" baseline) and may remove edit revisions pointed to by lower priority baselines before (or instead of) omitting edit revisions pointed to by higher priority baselines.

Figure 4:
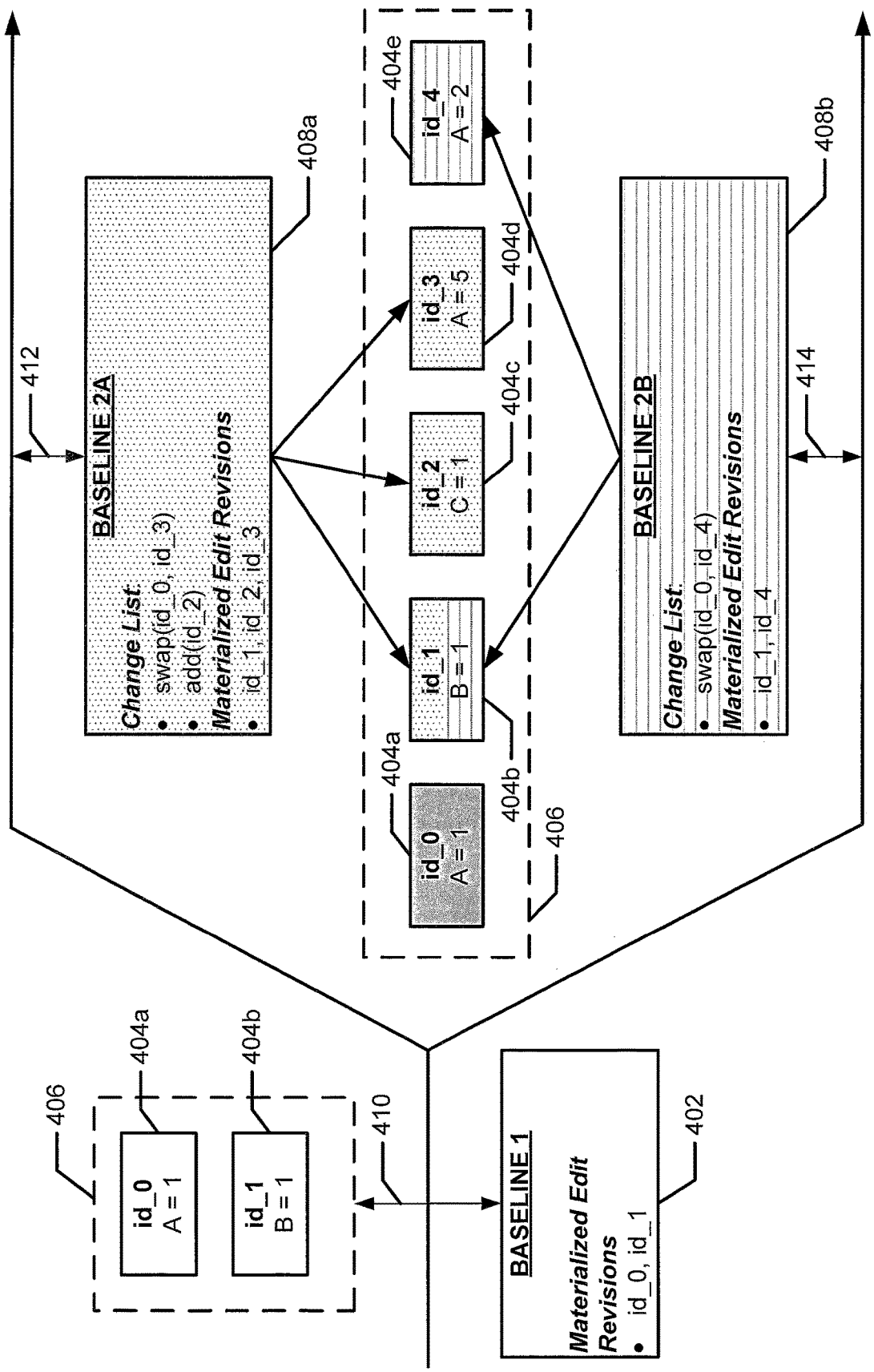
FIG. 4 is a block diagram depicting an example of creating parallel baselines of a data structure from a common set of edit revisions.

FIG. 4 illustrates an example situation in which the computing device 104 may simultaneously maintain parallel derived baselines of a data structure that have diverged from a common origin baseline, according to some embodiments. As illustrated, the computing device 104 may generate an origin baseline 402 of a data structure (not shown) at a time 410. Further, at the time 410, a shared data set 406 may include edit revisions 404a and 404b, and the origin baseline 402 may indicate that these edit revisions 404a and 404b are materialized in an origin materialization of the data structure (not shown).

In some embodiments, the computing device 104 may respond to an edit user's request to create parallel or "forked" materializations of a data structure. In particular, the edit user may desire to create two different materializations of the data structure for purposes of testing the appeal, usability, efficiency, or other characteristics of the data structure. For example, the edit user may desire to conduct A/B testing, in which two different materializations of the data structure are presented to end users and data regarding the preferences of these end users is measured for use in later implementations of the data structure. In another example, an edit user may desire to add experimental features to the data structure without having to worry about affecting a prior, stable implementation of the data structure.

In the example illustrated in FIG. 4, the computing device 104 may generate a first derived baseline 408a from the origin baseline 402, at a time 412a. The first derived baseline 408a may correspond to implementation of a particular change list from the origin baseline 402 of the data structure. Particularly, the first derived baseline 408a may follow from the computing device 104's swapping the edit revision 404a for an edit revision 404d and adding another edit revision 404c. The operations that the computing device 104 performed as part of generating the first derived baseline 408a may be reflected in the inclusion of edit revisions 404c and 404d into the shared data set. The first derived baseline 408a may also include pointers to the edit revisions stored in the shared data set 406 that are designated as materialized (e.g., edit revisions 404b, 404c, and 404d).

At a time 414 following the time 410, the computing device 104 may generate a second derived baseline 408b of the data structure. The second derived baseline 408b may correspond to application of a change list to the origin baseline 402 of the data structure, wherein the change list may cause distinct changes from those changes described with reference to the first derived baseline 408a. As such, the second derived baseline 408b may reflect that the computing device 104 swapped the edit revision 404a for a new edit revision 404e having a desired value of "A=2." While the computing device 104 swapped the edit revision 404a for the edit revision 404d as part of generating the first derived baseline 408a, as illustrated, the operations to swap the edit revision 404a for the first derived baseline 408a and the second derived baseline 408b are distinct. Specifically, in order to swap the edit revision 404a as part of generating the first derived baseline 408a, the computing device 104 may have added the edit revision 404d having the value "A=5" to the shared data set 406. In contrast, in order to swap the edit revision 404a as part of generating the second derived 408b, the computing device 104 may have added the edit revision 404e having the value "A=2."

In some embodiments, the computing device 104 may maintain separate baselines of a data structure using edit revisions included in the same shared data set. Specifically, because the edit revisions are never removed or modified once stored in the shared data set, the computing device 104 may provide users with different data structure baselines that utilize one or more of the same edit revisions. For example, as illustrated in FIG. 4, the first derived baseline 408a and the second derived baseline 408b may include pointers to the edit revision 404b without conflicting.

Figure 5:
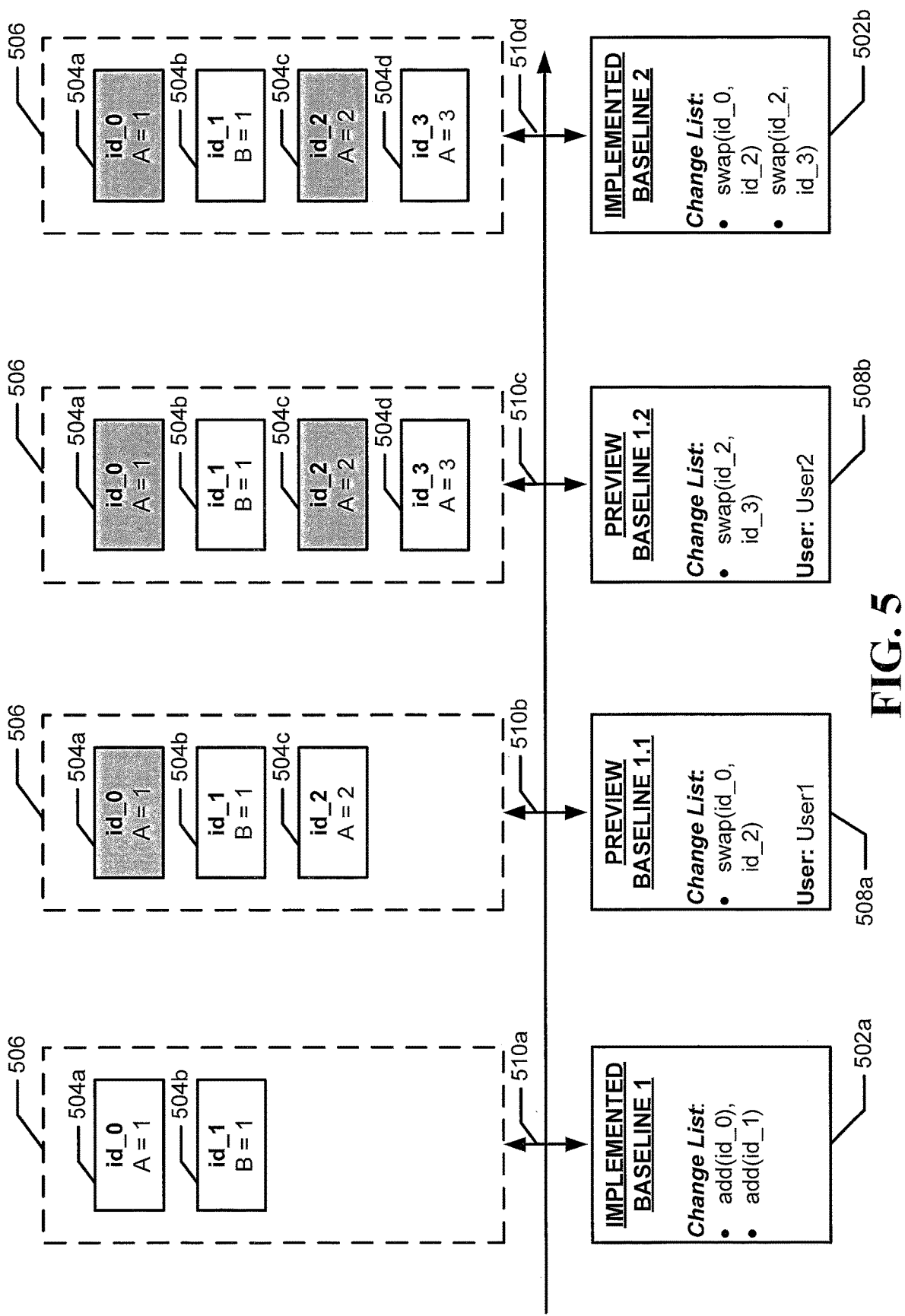
FIG. 5 is a block diagram depicting an example process for generating preview baselines of anticipated future states of a data structure.

FIG. 5 illustrates a timeline in which the computing device 104 generates preview baselines of a data structure (not shown), according to some embodiments. As described, the computing device 104 may receive requests to change a materialization of a data structure defined by a baseline, and in response, the computing device 104 may generate a modified baseline of the data structure to reflect the requested changes. In some embodiments, the computing device 104 may also receive edit users' requests to make tentative changes to a materialization of the data structure at a scheduled time in the future. In such embodiments, the computing device 104 may prepare one or more preview baselines of the data structure to reflect the tentative changes that are scheduled to occur. The computing device 104 may then provide preview materializations defined by these one or more preview baselines to other edit users in order to demonstrate the expected state of the data structure in the future and to enable edit users to request additional tentative changes that rely on previously requested tentative changes.

In the example illustrated in FIG. 5, the computing device 104 may generate a first implemented baseline 502a of a data structure (not shown) at a time 510a. The first implemented baseline 502a may optionally include a change list indicating that the computing device 104 added the edit revisions 504a and 504b to the data structure and stored these edit revisions 504a and 504b in the shared data set 506. At a time 510b, the computing device 104 may receive a request from a first edit user (illustrated in FIG. 5 as 'User1") to tentatively swap the edit revision 504a having a value of "A=1" with an edit revision 504c having a value of "A=2." Specifically, in response, the computing device 104 may add an edit revision 504c having the value "A=2" to the shared data set 506. The computing device 104 may also generate a first preview baseline 508a of the data structure, and the first preview baseline 508a may include information indicating the operation the computing device 104 performed (e.g., swapping out the edit revision 504a), pointers to the edit revisions designated as materialized in view of the tentative change (e.g., edit revisions 504b and 504c), and the edit user that provided the tentative change request (e.g., the first user).

After generating the preview baseline 508a, the computing device 104 may provide a preview materialization of the data structure defined by the preview baseline 508a to edit users, which may enable those edit users to determine the tentative changes that the computing device 104 is scheduled to perform in the future. As a result, edit users may request other tentative changes in view of the tentative changes already scheduled to occur. In the example illustrated in FIG. 5, the computing device 104 may receive a request, at a time 510c, from a second edit user (illustrated in FIG. 5 as "User2") to make a tentative change based on the tentative change requested by the first edit user at the time 510b. Specifically, the tentative change may correspond to swapping the edit revision 504c having the value "A=2" with an edit revision 504d having a value "A=3." As such, in response to the second edit user's tentative change request, the computing device 104 may add an edit revision 504d having the desired value "A=3" and may omit the edit revision 504c. The computing device 104 may then generate a second preview baseline 508b that includes information indicating the change to the edit revision 504c, pointers to the edit revisions designated as materialized in view of the tentative changes (e.g., edit revisions 504b and 504d), and the edit user associated with the tentative change request (e.g., the second edit user). The computing device 104 may then generate a second implemented baseline 502b that incorporates the tentative changes from the preview baselines 508a and 508b.

For ease of description, the creation of the preview baselines 508a and 508b is described as occurring sequentially such that second preview baseline 508b is generated based on preview baseline 508a. However, according to various embodiments, preview baselines may not be required to be derived sequentially. For example, the second preview baseline 508b may have been derived from the first implemented baseline 502 without relying on the first preview baseline 508a as an intermediate.

Figure 6:
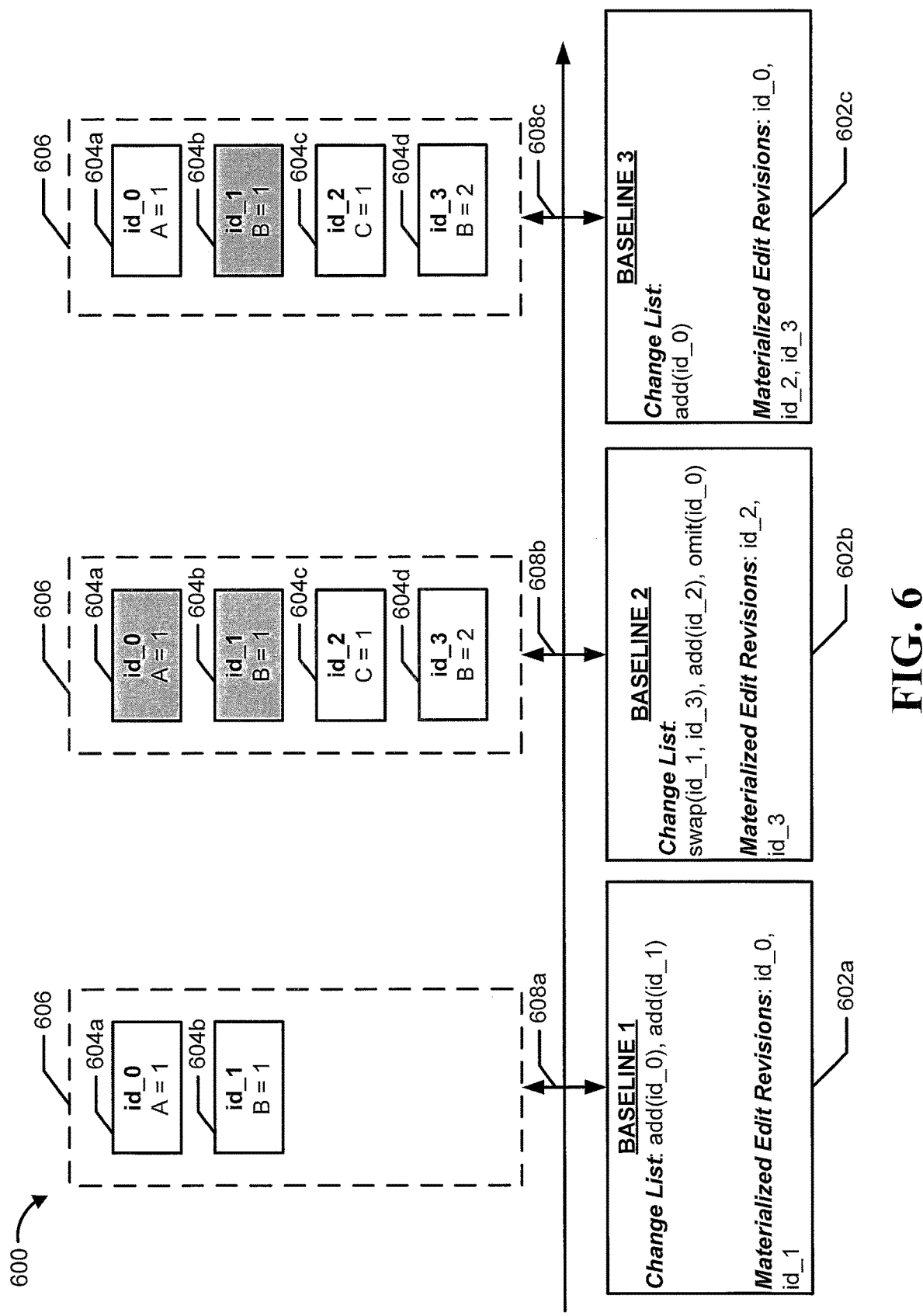
FIG. 6 is a block diagram depicting an example process of selectively reverting a portion of a materialization of a data structure defined by a baseline of the data structure to an earlier materialization.

FIG. 6 illustrates a timeline in which the computing device 104 selectively reverts a portion of a materialization of a data structure as defined by a baseline to a materialization of the data structure as defined by another baseline.

According to some embodiments, the computing device 104 may detect that a state of a data structure is undesirable. For example, the computing device 104 may determine that a change to the data structure has resulted in an internal inconsistency or error. Additionally (or alternatively), the computing device 104 may receive a user input indicating that a change to a data structure has resulted in a materialization of at least a portion of the data structure being less desirable than an earlier materialization of that portion of the data structure. In such embodiments, the computing device 104 may, independently or in response to a request from an edit user, selectively edit a baseline of a data structure to revert at least a portion of the data structure to an earlier, desirable state.

As described, in some embodiments, baselines that the computing device 104 generates may include information regarding the history of changes the computing device 104 has made since the most recent baseline. In some embodiments, this information regarding the history of changes may include a change list that the computing device 104 has performed (e.g., adding, omitting, or swapping an edit revision, node, tree, edge, or another component of the data structure). As such, in response to determining that a change to the data structure has resulted in an undesirable condition, the computing device 104 may identify the entity associated with the undesirable condition. For example, the computing device 104 may identify the particular node or individual edit revision that is associated with an undesirable condition. The computing device 104 may then utilize the change list of the baseline of the data structure to identify changes or change commands associated with the identified entity, and the computing device 104 may "undo" the change by performing a change command inverse to the change command that caused the undesirable condition to occur. Thus, rather than simply reverting an entire materialization of the data structure to an earlier state, the computing device 104 may revert only the portion of the materialization of the data structure that is associated with the undesirable condition to an earlier state that may avoid the undesirable condition.

In the example illustrated in FIG. 6, the computing device 104 may generate a first baseline 602a of a data structure (not shown) at a time 608a. The first baseline 602a may include information indicating that the computing device 104 added the edit revisions 604a and 604b to the shared data set 606 (e.g., by performing the change commands "add(id_0)" and "add(id_1)") and may include pointers to the edit revisions 604a and 604b that are designated as materialized in a materialization of the data structure defined by the first baseline 602a. At a time 608b, the computing device 104 may generate a second baseline 602b that indicates that the computing device 104 performed operations to change the edit revision 604b (e.g., "swap(id_1, id_3)"), add a new edit revision 604c (e.g., "add(id_2)"), and remove the edit revision 604a (e.g., "omit(id_0)"). As a result of performing these operations, the computing device 104 may have added the edit revisions 604c and 604d to the shared data set 606 and may have designated only edit revisions 604c and 604d as materialized in a materialization of the data structure defined by the second baseline 602b.

After making the changes reflected in the second baseline 602b, the computing device 104 may determine that the changes to the data structure have resulted in an undesirable condition. For example, the edit revision 604a may have been associated with a root node in a graph data base, and omitting the edit revision 604a from the edit revision may have compromised the structure of the entire graph. Alternatively, the computing device 104 may receive a request from an edit user to revert at least a portion of the materialization of the data structure defined by the second baseline 602b to the materialization of the data structure defined by the first baseline 602a.

For ease of description of the example illustrated in FIG. 6, it may be assumed that the computing device 104 has determined that omitting the edit revision 604a has resulted in an undesirable condition. As a result, the computing device 104 may determine the inverse of the operation or change command that removed the edit revision 604a. Specifically, the computing device 104 may reference the change list stored in the second baseline 602b to determine that the computing device 104 performed the change command "omit(id_0)" in order to remove the edit revision 604a from the data structure. The computing device 104 may then determine that the inverse of the change command "omit (id_0)" is "add(id_0)," and the computing device 104 may perform that inverse change command. As described above, the computing device 104 does not actually remove or change the values of edit revisions stored in the shared data set. Thus, omitting the edit revision 604a from the data structure may correspond to designating the edit revision 604a as not materialized (e.g., as illustrated in the second baseline 602b). As such, the computing device 104 may reverse the removal of the edit revision 604a from the data structure simply by designating the edit revision 604b as materialized. The computing device 104 may generate a third baseline 602c that includes information related to adding the edit revision 604a via the "add(id_0)" change command, as well as pointers to an updated list of materialized records that includes the edit revisions 604a, 604c, and 604d.

Figure 7:
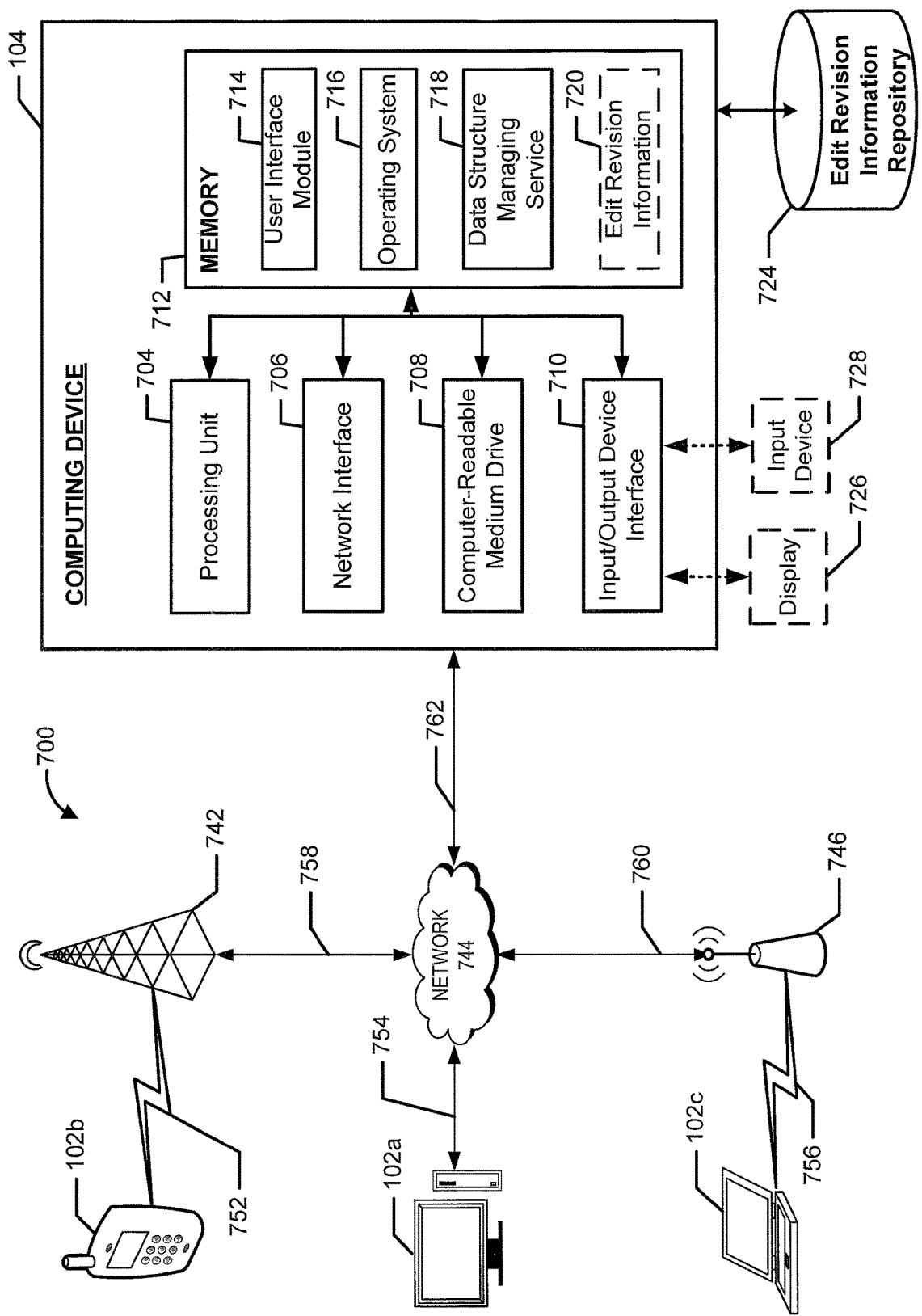
FIG. 7 is system diagram depicting an illustrative computing device that generates and manages a data structure, according to various embodiments.

FIG. 7 is a network diagram depicting an illustrative operating environment 700 including a computing device that maintains a shared data set of edit revisions and generates baselines of a data structure based on the edit revisions stored in the shared data set. The environment 700 may include the computing device 104 (e.g., as described with reference to FIGS. 1A-6). The environment 700 may further include one or more user computing devices, such as the user computing device 102a (e.g., as described with reference to FIGS. 1A and 1B) and one or more optional user computing devices 102b and 102c, which may be similar to or different from the user computing device 102a. In a non-limiting example, the user computing device 102a, 102b or 102c may be a personal computing device, laptop computing device, hand held computing device, terminal computing device, mobile device (e.g., mobile phones or tablet computing devices), wearable device configured with network access and program execution capabilities (e.g., "smart eyewear" or "smart watches"), wireless device, electronic reader, media player, home entertainment system, gaming console, set-top box, television configured with network access and program execution capabilities (e.g., "smart TVs"), or some other electronic device or appliance. For ease of description, environment 700 is illustrated as including three user computing devices 102a-c and including one computing device 104. However, the environment 700 may include one or more user computing devices and one or more computing devices without loss of generality.

In the environment 700, the computing devices 102a-c may each communicate with the computing device 104 by exchanging data and other information via a network 744. In an example, the user computing device 102b may communicate over the network 744 via a cellular link 752 to a cellular base station 742 that may maintain a wired link 758 to the network 744. The computing device 102b may send communications directly to the network 744 via wired link 754. The computing device 102c may communicate through the network 744 via a wireless connection 756 to a wireless access point 746 (e.g., a wireless router) that communicates with the network 744 via the wired link 760.

In some embodiments, the network 744 may route or forward requests for materializations of a data structure or request to change a data structure from the user computing devices 102a-c to the computing device 104 (e.g., as described with reference to FIGS. 1A and 1B) via communication link 762. In some embodiments, each of the user computing devices 102a-c may request materializations of a data structure according to the same baseline or according to different baselines. For example, the user computing device 102a may request a materialization of a data structure according to a first baseline, and the user computing device 102b may request a materialization of the data structure according to a second baseline. In response to receiving requests for materializations of a data structure from the one or more of the user computing devices 102a-c, the computing device 104 may send the requested materializations through the network 744. In response to receiving requests to change a data structure from the one or more user computing devices 102a-c, the computing device 104 may implement the requested changes to the data structure and may generate a new baseline (or a new preview baseline) of the data structure based on those changes.

In some embodiments, the computing device 104 may be in communication with an edit revision information repository 724, which may include one or more edit revisions or other information that the computing device 104 may utilize to generate data structures. For example, the edit revision information repository 724 may store individual edit revisions, baselines of data structures, change list information, information regarding edit revisions that are designated as materialized for certain baselines, and the like. The edit revision information repository 724 may be local or remote to the computing device 104, and/or may be a network-based service itself. The edit revision information repository 724 may be embodied in hard disk drives, solid state memories, any other type of non-transitory computer-readable storage medium, and/or a file, a database, a relational database, in-memory cache, and/or stored in any such non-transitory computer-readable medium accessible to the computing device 104. The edit revision information repository 724 may also be distributed or partitioned across multiple local and/or storage devices without departing from the spirit and scope of the present disclosure.

In some embodiments (not shown), one or more of the user computing devices 102a-102c may send requests to the computing device 104 through one or more proxy servers. In such embodiments, the one or more proxy servers may receive the requests from the one or more user computing devices 102a-c and may forward these requests to the computing device 104. Similarly, the one or more proxy servers may receive responses from the computing device 104 and may forward those responses to the appropriate user computing device 102a-c.

The network 744 may be any wired network, wireless network, or combination thereof. By way of some non-limiting examples, the network 744 may be a personal area network, local area network, wide area network, over-the-air broadcast network (e.g., for radio or television), cable network, satellite network, cellular telephone network, etc. or combination thereof. For example, the network 744 may be a publicly accessible network of linked networks, possibly operated by various distinct parties, such as the Internet. In some embodiments, the network 744 may be private or semi-private networks, such as a corporate or university intranets. The network 744 may include one or more wireless networks, such as a Global System for Mobile Communications (GSM) network, a Code Division Multiple Access (CDMA) network, a Long Term Evolution (LTE) network, or some other type of wireless network. The network 744 may use protocols and components for communicating via the Internet or any of the other aforementioned types of networks. Protocols and components for communicating via the Internet or any of the other aforementioned types of communication networks are well known to those skilled in the art and, thus, are not described in more detail herein.

It will be recognized that many of the devices described above are optional and that embodiments of the environment 700 may or may not combine devices. Furthermore, devices need not be distinct or discrete. Devices may also be reorganized in the environment 700. For example, the computing device 104 may be represented in a single physical server or, alternatively, may be split into multiple physical servers. In some embodiments, the computing device may be implemented as a user computing device 102a, 102b, or 102c. Additionally, the environment 700 may not include a network 744.

FIG. 7 further depicts a general architecture of the computing device 104, which includes an arrangement of computer hardware and software components that may be used to implement aspects of the present disclosure. The computing device 104 may include many more (or fewer) elements than those shown in FIG. 7. It is not necessary, however, that all of these generally conventional elements be shown in order to provide an enabling disclosure.

As illustrated, the computing device 104 includes a processing unit 704, a network interface 706, a computer readable medium drive 708, and an input/output device interface 710, all of which may communicate with one another by way of a communication bus. The network interface 706 may provide connectivity to one or more networks (e.g., the network 744) or computing systems and, as a result, may enable the computing device 104 to receive and send information and instructions from and to other computing systems or services. For example, the computing device 104 may receive requests for materializations of data structures or request to change data structures from the user computing device 102a via the network interface 706, and in some situations, the processing unit 704 may send a materialization of a data structure to the requesting user computing device 102a over the network 744 using the network interface 706.

The processing unit 704 may also communicate to and from memory 712. The memory 712 may contain computer program instructions (grouped as modules or components in some embodiments) that the processing unit 704 may execute in order to implement one or more embodiments. The memory 712 generally includes RAM, ROM, and/or other persistent, auxiliary, or non-transitory computer-readable media. The memory 712 may store an operating system 714 that provides computer program instructions for use by the processing unit 704 in the general administration and operation of the computing device 104. The memory 712 may include a user interface module 716 that the processing unit 704 may utilize in conjunction with the input/output device interface 710. The memory 712 may further include computer program instructions and other information for implementing aspects of the present disclosure. For example, in some embodiments, the memory 712 may include a data structure managing service 718, which may be executed by the processing unit 704 to perform various operations, such as those operations described with reference to FIGS. 1A-6 and 8-11.

In some embodiments, the data structure managing service 718 may implement various aspects of the present disclosure. For example, the data structure managing service 718 may obtain a request to change a data structure. In response, the data structure managing service 718 may implement the requested change by adding additional edit revisions to a shared data set (e.g., the edit revision information 720 or the edit revision information repository 724) and/or by determining a set of edit revisions that should be designated as materialized based on the change to the data structure. In some embodiments, the data structure managing service 718 may implement the change by selectively reverting a portion of a materialization of the data structure to a previous materialization. The data structure managing service 718 may also (or alternatively) implement the change by creating a baseline of the data structure that is developed in parallel with another baseline. In some embodiments, the data structure managing service 718 may receive requests to make a tentative change to the data structure, and in response, the data structure managing service 718 may generate a preview baseline of the data structure to reflect the tentative change and may provide a preview materialization of the data structure defined by the preview baseline of the data structure as a preview of the changes to the data structure that are expected to occur.

Additionally, in some embodiments, the data structure managing service 718 may be implemented by one more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a "cloud" computing environment.

While the data structure managing service 718 is illustrated as a distinct module in the memory 712, in some embodiments, the data structure managing service 718 may be incorporated as a module in the operating system 716 or another application or module, and as such, a separate data structure managing service 718 may not be required to implement some embodiments.

For ease of description, the example illustrated in FIG. 7 depicts one computing device 104 in communication with the user computing devices 102a-102c. However, in some embodiments, the user computing devices 102a-102c may be in communication with one or more computing devices similar to the computing device 104. In such embodiments, each of the computing devices may maintain a shared data set of edit revisions and baseline information regarding one or more baselines of a data structure generated from the edit revisions in the shared data set. Each of the computing devices may provide materializations of a data structure to the user computing devices 102a-102c according to different baselines and may respond to requests from one or more of the user computing devices 102a-102c to change those materializations.

Each of the computing devices may replicate or share their respective shared data sets to include the same edit revisions, thereby enabling the user computing devices 102a-102c to request data structure materializations from any of the computing devices. In some embodiments, the replication or sharing of shared data sets between computing devices may occur in substantially real time (e.g., immediately in response to a change to a shared data set), thereby causing each of the computing devices to maintain a substantially similar shared data set of edit revisions. However, in some alternative (or additional) embodiments, the computing devices may replicate or share their respective shared data sets at predetermined times (e.g., eventually in response to a change to a shared data set). Specifically, because edit revisions that are added to a shared data set remain valid, a computing device's shared data set may not store "stale" or invalid data. As such, while a computing device's shared data set may not reflect the most recent state of the data structure, the computing device may still respond to request for materializations of the data structure according to earlier baselines without providing the user computing device with invalid data. Thus, distributed computing systems that include more than one computing device may allow each computing device to operate independently by utilizing the data independently and without coordination or synchronization between other computing devices. One non-limiting benefit of a computing device's ability to operate independently is that user computing devices may continue requesting data structure materializations from the computing device without having to wait for the computing device to synchronize its shared data set with other computing devices and without the risk of receiving invalid data from the computing device.

In some embodiments in which multiple computing devices service one or more user computing devices, each of the computing devices may respond to change requests from the one or more user computing devices to arrive at the same materialization of a data structure without having to synchronize edit revisions and without introducing inconsistency into immediately or eventually replicated shared data sets. Specifically, because baselines require only uniqueness of edit revisions, two (or more) computing devices may arrive at different baselines of a data structure that are equivalently identical in that separate baselines may correspond to the same materialization of a data structure. In this scenario, the different baselines may include information regarding different edit revisions that are materialized but the different baselines may not conflict. As such, a user computing device may request a materialization of the data structure using any one of these baselines.

In some embodiments, different computing devices may store different portions or amounts of a common shared data set. For example, a first computing device may store only the edit revisions in the shared data set that are associated with baselines created within the last day, a second computing device may store edit revisions in the shared data set associated with baselines created within the last week, and the like. In this example, a user computing device may first send requests for a materialization of (or changes to) a data structure to the first data structure. In the event that the first computing device does not include the edit revisions needed to generate the request materializations, the first computing device may forward the request to the second computing device to leverage the relatively larger number of edit revisions stored at the second computing device. As such, in some embodiments, a purpose of a computing device may affect the extent to which the computing device includes the common shared data set. Specifically, some computing devices may store edit revisions associated with recent baselines of a data structure to quickly respond to requests, whereas other computing devices may store a larger portion of the common shared data set and may function at least in part as an archival service that can respond to request for older baselines. In some embodiments, different computing devices may store a subset of edit revisions for a data structure, such as a subset of a graph data structure. In such embodiments, a computing device may store edit revisions or pointer blocks related to a subset of the data structure according to one or more baselines. For example, a computing device may store edit revisions that define a node in a graph data structure that is defined by one or more different baselines.

Figure 8:
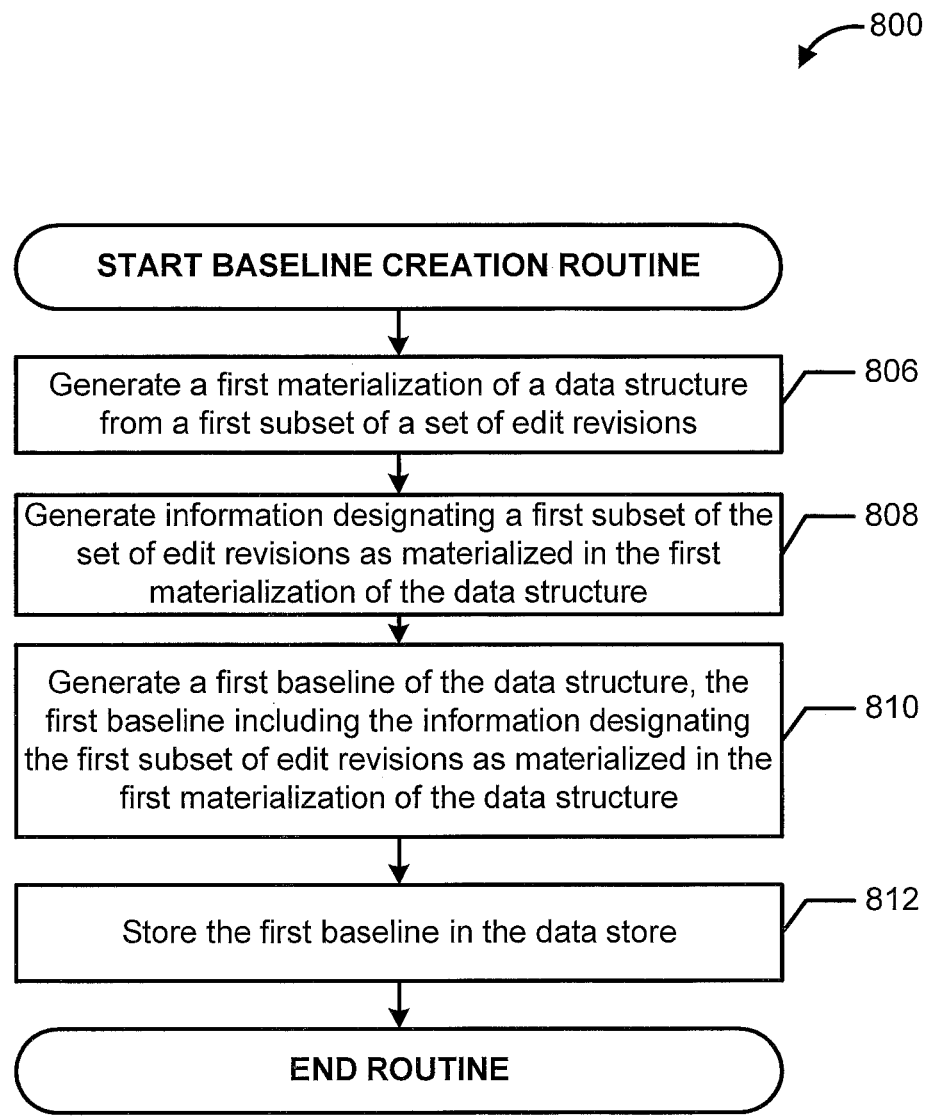
FIG. 8 is a flow diagram depicting an illustrative computer-implemented method that may be implemented by the computing device shown in FIG. 7 to generate a first baseline of a data structure.

FIG. 8 is a flow diagram depicting an illustrative computer-implemented method or routine 800 for creating a baseline of a data structure, according to some embodiments. The routine 800 may be implemented by a data structure managing service operating on a computing device (e.g., the data structure managing service 718 of the computing device 104 as described with reference to FIG. 7).

In block 806, the data structure managing service 718 may generate a data structure from a first subset of edit revisions. In some embodiments, the data structure managing service 718 may obtain the first subset of edit revisions from a set of edit revisions stored in a shared data set. For example, the data structure managing service 718 may obtain the first subset of edit revisions externally from the edit revision information repository 724 and/or internally from the memory 712 (e.g., as described with reference to FIG. 7).

In block 808, the data structure managing service 718 may generate information designating the first subset of the set of edit revisions as materialized with respect to a first materialization of the data structure. In some embodiments, the data structure managing service 718 may generate pointers to the first subset of edit revisions. In some alternative embodiments, the data structure managing service 718 may label or otherwise indicate that the first subset of edit revisions are represented in or used to create the first materialization of the data structure. In some embodiments (not shown), the data structure managing service 718 may additionally indicate or designate edit revisions that are not included in the first subset of edit revisions as not materialized with respect to the first materialization of the data structure.

The data structure managing service 718 may, in block 810, generate a first baseline of the data structure. In some embodiments of the operations performed in block 810, the data structure managing service 718 may generate the first baseline such that the first baseline includes the information generated in block 808 that indicates that the first subset of edit revisions is materialized with respect to the first materialization of the data structure. For example, the data structure managing service 718 may include the pointers to the first subset of edit revisions in the first baseline. Because the first baseline includes information describing the edit revisions that make up or define the first materialization of the data structure, the data structure managing service 718 may utilize the first baseline at any time to recreate the first materialization of the data structure, to compare the first materialization of the data structure to another materialization of the data structure, to audit changes since or from creation of the first materialization of the data structure, and the like. Accordingly, the data structure managing service 718 may store the first baseline in the shared data set in block 812.

The data structure managing service 718 may then cease performing the operations of the routine 800.

In some embodiments, the first baseline may store information identifying the edit revisions associated with the first materialization of the data structure without actually storing those edit revisions as part of the baseline. As noted above, the baseline may include pointers, references, or links to the edit revisions stored in the shared data set. As a result and as further described herein (e.g., with reference to FIG. 9), the data structure managing service 718 may generate a baseline representing a change to the first materialization of the data structure by adding new edit revisions to the shared data set (if necessary) and by generating a second baseline that includes pointers to the edit revisions reflected in the second materialization. Thus, the data structure managing service 718 may generate subsequent baselines of the data structure without needing to copy edit revisions in the shared data set, thereby utilizing comparatively less memory than, for example, storing copies of the edit revisions for each different version of the data structure. Additionally where pointer blocks with block revisions that point to edit revisions are shared between baselines (that is the exact same pointer blocks exist in both), the baselines may contain only references to the pointer blocks, thereby further reducing the duplication of data between baselines.

Figure 9:
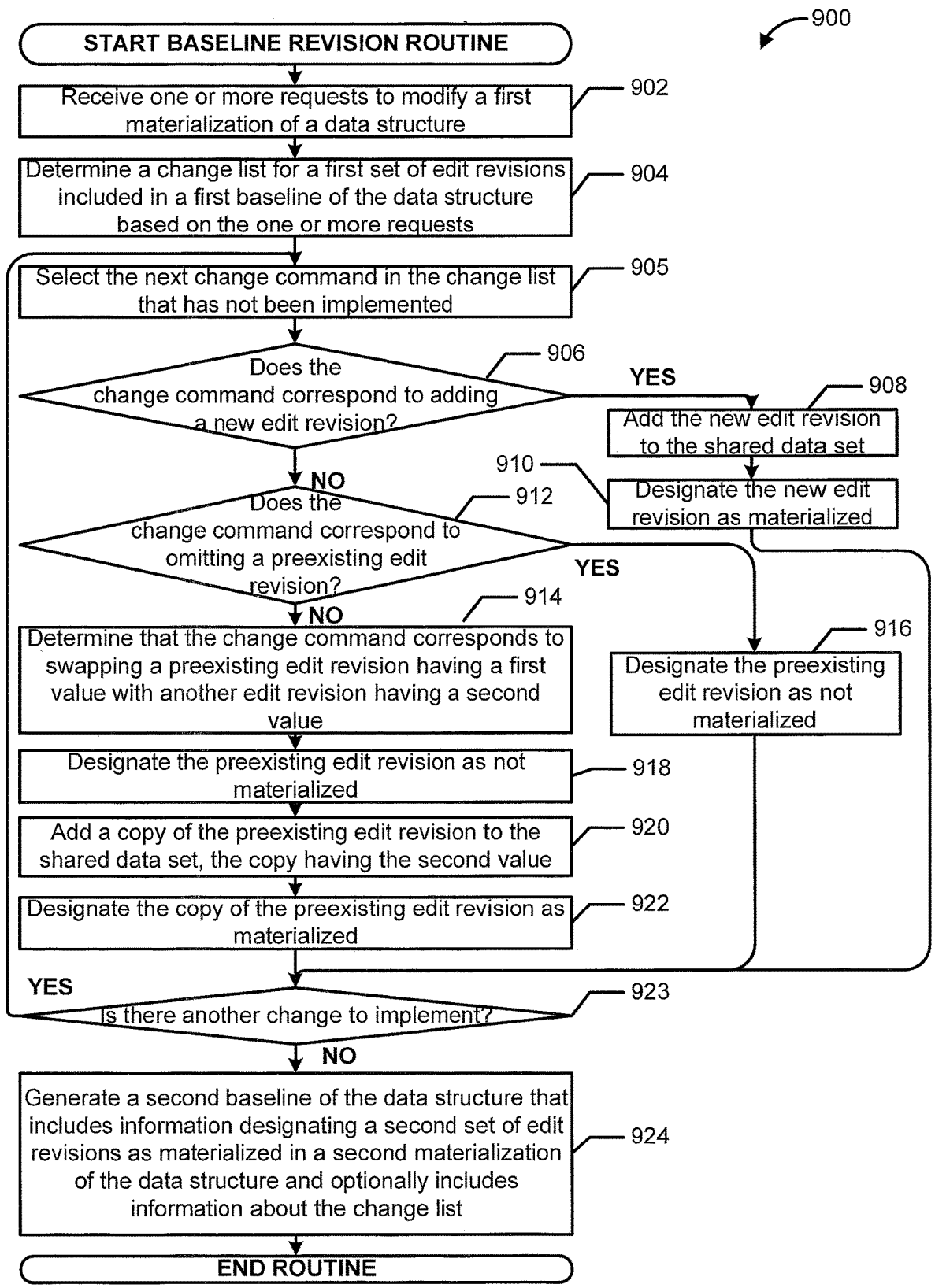
FIG. 9 is a flow diagram depicting an illustrative computer-implemented method that may be implemented by the computing device shown in FIG. 7 to generate a second baseline of the data structure.

FIG. 9 is a flow diagram depicting an illustrative computer-implemented method or routine 900 for revising a baseline of a data structure, according to some embodiments. The routine 900 may be implemented by a data structure managing service operating on a computing device (e.g., the data structure managing service 718 of the computing device 104 as described with reference to FIG. 7).

In block 902, the data structure managing service 718 may receive a request to modify a first materialization of the data structure, such as from a user computing device (e.g., the user computing device 102a as described with reference to FIGS. 1A and 1B). In some embodiments, the request to modify the first materialization of the data structure may indicate components of the first materialization of the data structure that are desired to be changed. For example, the request may indicate that one or more nodes, edges/links, trees, branches, or the like of a materialization of a graph data structure should be changed. The request may further indicate the type of change command (e.g., add, remove, or swap), desired values for components, or specific instructions for how to modify the materialization of the data structure. In some embodiments, the request may include more granular instructions to add or remove one or more edit revisions associated with the first materialization.

In block 904, the data structure managing service 718 may determine a change list to the first set of edit revisions included in the first baseline of the data structure based on the request. In some embodiments of the operations performed in block 904, the data structure managing service 718 may determine the edit revisions in the first materialization that would be affected as a result of implementing the requested change received in block 902. For example, the data structure managing service 718 may determine that one or more edit revision associated with the first materialization of the data structure should be added or omitted as a result of the requested change, or that one or more new edit revisions should be associated with the data structure as a result of the change. In some embodiments, the change list may be ordered such that the data structure managing service 718 implements the change ordered first in the set before the change ordered second, and so forth. In such embodiments, the order of the change list may reflect a history of changes or change list based on an order in which the changes were received from one or more user computing devices, or the desired relative order of application indicated by the users. For example, the change list may reflect that a first change to add an edit revision is to be applied before a second change to remove the same edit revision. In some embodiments, the computing device may analyze the change list to identify inconsistent changes. For example, the computing device may determine that a first change to remove an edit revision is ordered before a second change to add that edit revision. In this example, the computing device may determine that the second change must occur before the first change can be implemented and may generate a notification indicating the inconsistency or may proactively revise the order such that the first change occurs after the second change In block 905, the data structure managing service 718 may select the next change command in the change list determined in block 904 that has not been implemented. In decision block 906, the data structure managing service 718 may determine whether the change command selected in block 905 corresponds to adding a new edit revision to the shared data set. In response to determining that the change command corresponds to adding a new edit revision to the shared data set (i.e., decision block 906="YES"), the data structure managing service 718 may add the new edit revision to the shared data set in block 908. In block 910, the data structure managing service 718 may designate the new edit revision as materialized (e.g., with respect to a second materialization of the data structure, as further described below).

In response to determining that the change command does not correspond to adding a new edit revision to the shared data set (i.e., decision block 906="NO"), the data structure managing service 718 may determine whether the change command corresponds to omitting a preexisting edit revision from the shared data set, in decision block 912. In response to determining that the change command does correspond to omitting a preexisting edit revision (i.e., decision block 912="YES"), the data structure managing service 718 may designate the preexisting edit revision as not materialized in block 916 (e.g., with respect to a second materialization of the data structure). Further, because the edit revisions are immutable, the data structure managing service 718 may designate the preexisting edit revision as not materialized in block 916 without omitting the preexisting edit revision from the shared data set.

In response to determining that the change command does not correspond to omitting a preexisting edit revision (i.e., decision block 912="NO"), the data structure managing service 718 may determine that the change command corresponds to swapping a preexisting edit revision having a first value with another edit revision to a second value, in block 914. In response, the data structure managing service 718 may designate the preexisting edit revision as not materialized, in block 918. Further, in block 920, the data structure managing service 718 may add a modified copy of the preexisting edit revision to the shared data set such that the copy of the preexisting edit revision has the second value. The data structure managing service 718 may then designate the copy of the preexisting edit revision as materialized, in block 922.

In response to designating the copy of the preexisting edit revision as materialized in block 922, designating the preexisting edit revision as not materialized in block 916, or designating the new edit revision as materialized in block 910, the data structure managing service 718 may determine whether there is another change command in the change list to implement, in decision block 923. In response to determining that there is another change command in the change list to implement (i.e., decision block 923="YES"), the data structure managing service 718 may repeat the above operations in a loop by selecting the next change command in the change list that has not been implemented in block 905. As such, the data structure managing service 718 may continue implementing the change commands until the data structure managing service 718 has implemented each change command in the change list.

Thus, in response to determining that there is not another change command to implement (i.e., decision block 923="NO"), the data structure managing service 718 may generate a second baseline of the data structure, in block 924. In some embodiments, the second baseline of the data structure may include information regarding the change command to the first set of edit revisions as determined in block 904. In some embodiments, this information may be generated in the form of a change list or a sequential list of change commands. The second baseline of the data structure may also (or alternatively) include pointers to the one or more edit revisions in the shared data set that are designated as materialized with reference to the second materialization of the data structure. As described, a baseline of a data structure may include information regarding the edit revisions that are utilized to generate a particular materialization of the data structure without actually including copies of those edit revisions. Thus, the second baseline generated in block 924 may reflect a different version/materialization of the data structure than the first baseline (e.g., as generated in block 810 as described with reference to the routine 800) without having to copy the edit revisions indicated in the first baseline. Because the second baseline indicates all of the edit revisions needed to create a second materialization of the data structure, the data structure managing service 718 may, for example, generate the second materialization of the data structure at a later time without referencing the first baseline and without having to apply a chain of changes (e.g., as required in current revision control systems). As a result, because the data structure managing service 718 does not need to follow a chain of changes from the state of the data structure as reflected in the first baseline to the state of the data structure as reflected in the second baseline, the amount of time and resources to generate the second materialization of the data structure may be predetermined directly from the information in the second baseline. In contrast, some revision control systems require application of a chain of changes to materialize a data structure. As the length of a chain of changes is typically not known in advance, the performance of these current revision control systems cannot be predicted.

The data structure managing service 718 may then cease performing the operations of the routine 900.

Figure 10:
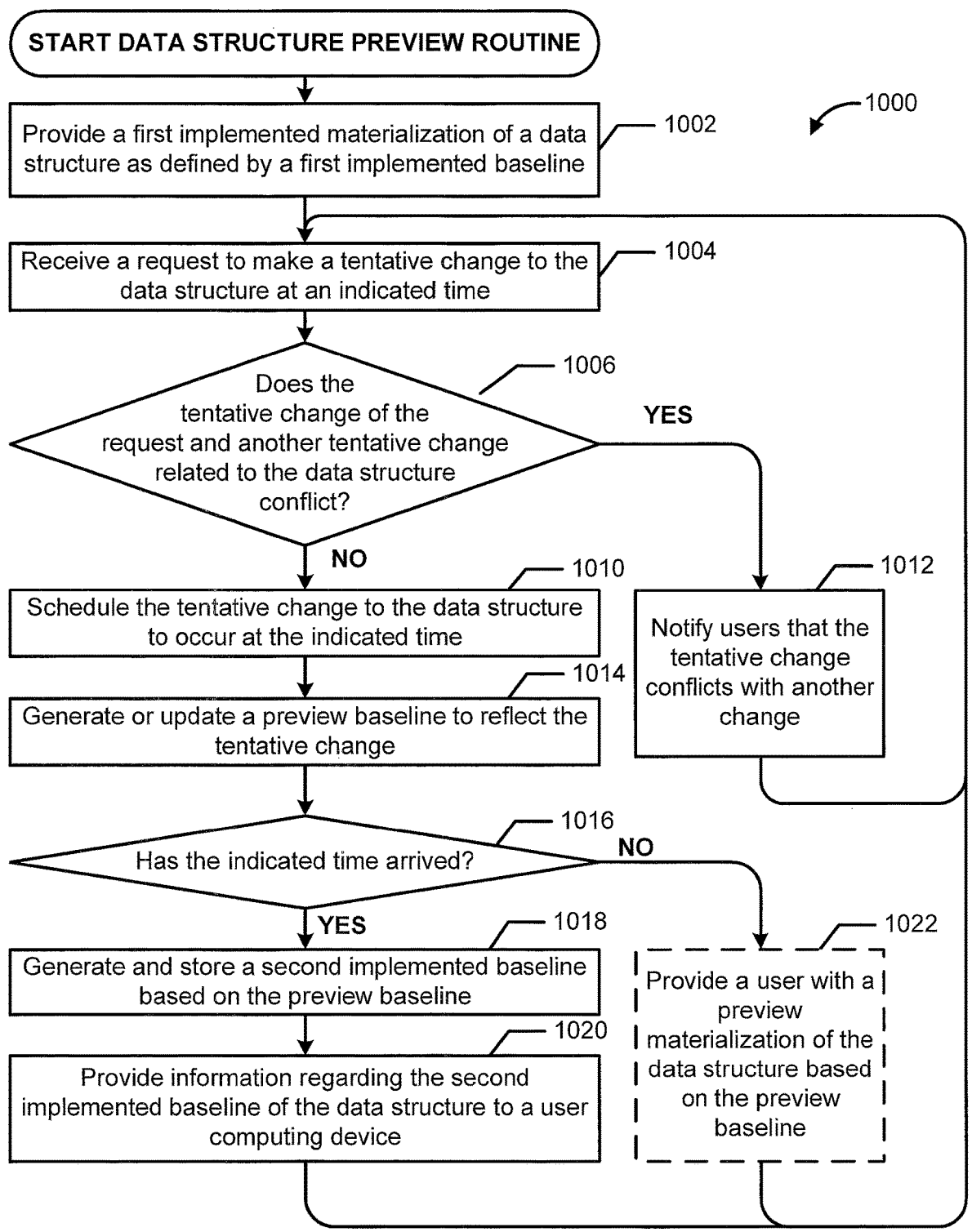
FIG. 10 is a flow diagram depicting an illustrative computer-implemented method that may be implemented by the computing device shown in FIG. 7 to create preview baselines of a data structure based on tentative changes to an implemented baseline of a data structure.

FIG. 10 is a flow diagram depicting an illustrative computer-implemented method or routine 1000 for generating a preview baseline of a data structure. The routine 1000 may be implemented by a data structure managing service operating on a computing device (e.g., the data structure managing service 718 of the computing device 104 as described with reference to FIG. 7).

In block 1002, the data structure managing service 718 may provide a first implemented materialization of the data structure, as defined by a first implemented baseline. As described (e.g., with reference to FIG. 5), an implemented baseline of a data structure may correspond to a currently or previously implemented state of the data structure. In contrast, a preview baseline may describe an anticipated or future state of the data structure and, as such, changes or other information included in the preview baseline be prospective and subject to modification or revision before being implemented.

In block 1004, the data structure managing service 718 may receive a request to implement a tentative change to the data structure at a time indicated in the request. In some embodiments (and as further described below), the data structure managing service 718 may implement a tentative change at the desired time that is associated with that tentative change. For example, the data structure managing service 718 may receive a request to remove a node from a graph data structure along with an indication that the node should be removed after one week. In some embodiments, the desired time may reflect a relative time or relative order in which the tentative change is intended to occur. For example, the desired time may indicate that the tentative change is to occur relative to another tentative change, at a certain point within a sequence of events, or relative to the occurrence of one or more events. Thus, in such embodiments, the desired change time may be one of an absolute time or a relative time.

The data structure managing service 718 may, in decision block 1006, determine whether the tentative change received in block 1004 conflicts with another tentative change related to the data structure. In some embodiments, in response to receiving a tentative change request, the data structure managing service 718 may identify the components or edit revisions of the data structure that would be affected by the tentative change request. The data structure managing service 718 may also determine whether another tentative change request is also related to the same components or edit revisions such that both tentative change requests cannot be satisfied. For example, the data structure managing service 718 may determine that the tentative change request received in the block 1004 corresponds to changing a node in a graph data structure, but another tentative change request may correspond to omitting that same node. In some embodiments, the data structure managing service 718 may check whether a starting condition and an ending condition related to a request can be satisfied and may determine that there is a conflict when either the starting or ending condition cannot be satisfied. In the above example, the tentative change request to remove the node may be associated with a starting condition of the node and an ending condition of the node. Thus, if the tentative change request to modify the node is performed, the starting condition of the removal request may not be satisfied. In some embodiments, the data structure managing service 718 may evaluate whether a conflict between tentative changes will occur in consideration of the indicated times associated with those tentative changes. In another example in which the tentative change received in block 1004 corresponds to omitting a node, the data structure managing service 718 may determine in decision block 1006 that omitting the node would conflict with another tentative change to modify the node because the tentative change to remove the node may be scheduled prior to the tentative change to modify the node. In other words, the data structure managing service 718 may determine that omitting the node before the node is scheduled to be modified would be improper because the node would not exist at the time the node is scheduled to be modified.

In response to determining that the tentative change of the request received in block 1004 conflicts with another tentative change (i.e., decision block 1006="YES"), the data structure managing service 718 may notify one or more edit users associated that the tentative changes conflict, in block 1012. In some embodiments, the data structure managing service 718 may provide the conflicting edit users with information regarding the conflict to enable those edit users to modify their tentative change requests. The data structure managing service 718 may repeat the above operations in a loop by receiving another request to implement a tentative change to the data structure, in block 1004.

In response to determining that the tentative change would not conflict with another tentative change (i.e., decision block 1006="NO"), the data structure managing service 718 may schedule the tentative change to the data structure to occur at the indicated time, in block 1010. In block 1014, the data structure managing service 718 may generate or update a preview baseline of the data structure to reflect the tentative change. As noted, the preview baseline of the data structure may be used to generate a prospective materialization of the data structure that reflects the tentative change. In some embodiments, the preview baseline may reflect a change to an implemented baseline that may not be the most recent implemented baseline. As such, the preview baseline may be useful to evaluate the effects of tentative changes to various implemented baselines as represented by the materialization of the data structure defined by the preview baseline.

In decision block 1016, the data structure managing service 718 may determine whether the indicated time associated with the tentative change request has arrived. In response to determining that the indicated time has not arrived (i.e., decision block 1016="NO"), the data structure managing service 718 may optionally provide an edit user with a preview materialization of the data structure, as defined by the preview baseline of the data structure, in optional block 1022. In some embodiments, the data structure managing service 718 may provide the edit user with a prospective materialization of the data structure according to the preview baseline generated in block 1014. The data structure managing service 718 may then repeat the above operations in a loop by receiving another request to implement a tentative change to the data structure, in block 1004.

In response to determining that the indicated time has arrived (i.e., decision block 1016="YES"), the data structure managing service 718 may generate a second implemented baseline from the preview baseline generated in block 1014 and may store the second implemented baseline in a shared data set, in block 1018. In some embodiments in which the data structure managing service 718 generates several preview baselines, the data structure managing service 718 may combine those preview baselines into a single implemented baseline. Additionally, the data structure managing service 718 may discard the preview baselines in response to generating the implemented baseline from those preview baselines.

In block 1020, the data structure managing service 718 may provide a second implemented materialization of the data structure, as defined by the second implemented baseline generated in block 1018, to a user computing device. The data structure managing service 718 may continue performing the above operations in a loop by receiving a request to implement a tentative change to the second implemented baseline, in block 1004.

In some embodiments, the data structure managing service 718 may apply a sequence of change lists to a baseline to generate another baseline. The order in which the data structure managing service 718 applies the change lists to the baseline may not affect the baseline that is generated in the event that the change lists are "independent" such that the change lists are not associated with any of the same edit revisions (or pointer blocks). For example, a first change list that includes a change command to add a first edit revision may be independent from a second change list that includes a change command to add a second edit revision because implementing these change lists in either order will result in the same changes (e.g., adding the first and second edit revisions). As such, in such embodiments, the data structure managing service 718 may have considerable flexibility regarding the order in which a preview or implemented baseline is ultimately generated. By way of an example, if a first change list and a second change list are independent, a materialization of a data structure defined by a preview baseline generated from an application of the first change list and the second change list to an implemented baseline (in that order) may be substantially similar to another materialization of the data structure defined by another preview baseline generated from an application of the second change list and the first change list to the same implemented baseline (in that order).

In some embodiments, a sequence of baselines may correspond with applications of a sequence of multiple change lists. For example, the data structure managing service 718 may generate a first preview baseline by applying the first change list to the implemented baseline and may generate a second preview baseline by applying the second change list to the first preview baseline. Alternatively, the data structure managing service 718 may generate a third preview baseline by applying the second change list to the implemented baseline and may generate a fourth preview baseline by applying the first change list to the third preview baseline. In this example, if the change lists are independent (as described above), the second preview baseline and the fourth preview baseline may be the same or substantially similar in that they may point to the same edit revisions or may define the same or substantially similar materializations of the data structure. Further, the data structure managing service 718 may generate the second and fourth baseline in any order.

Figure 11:
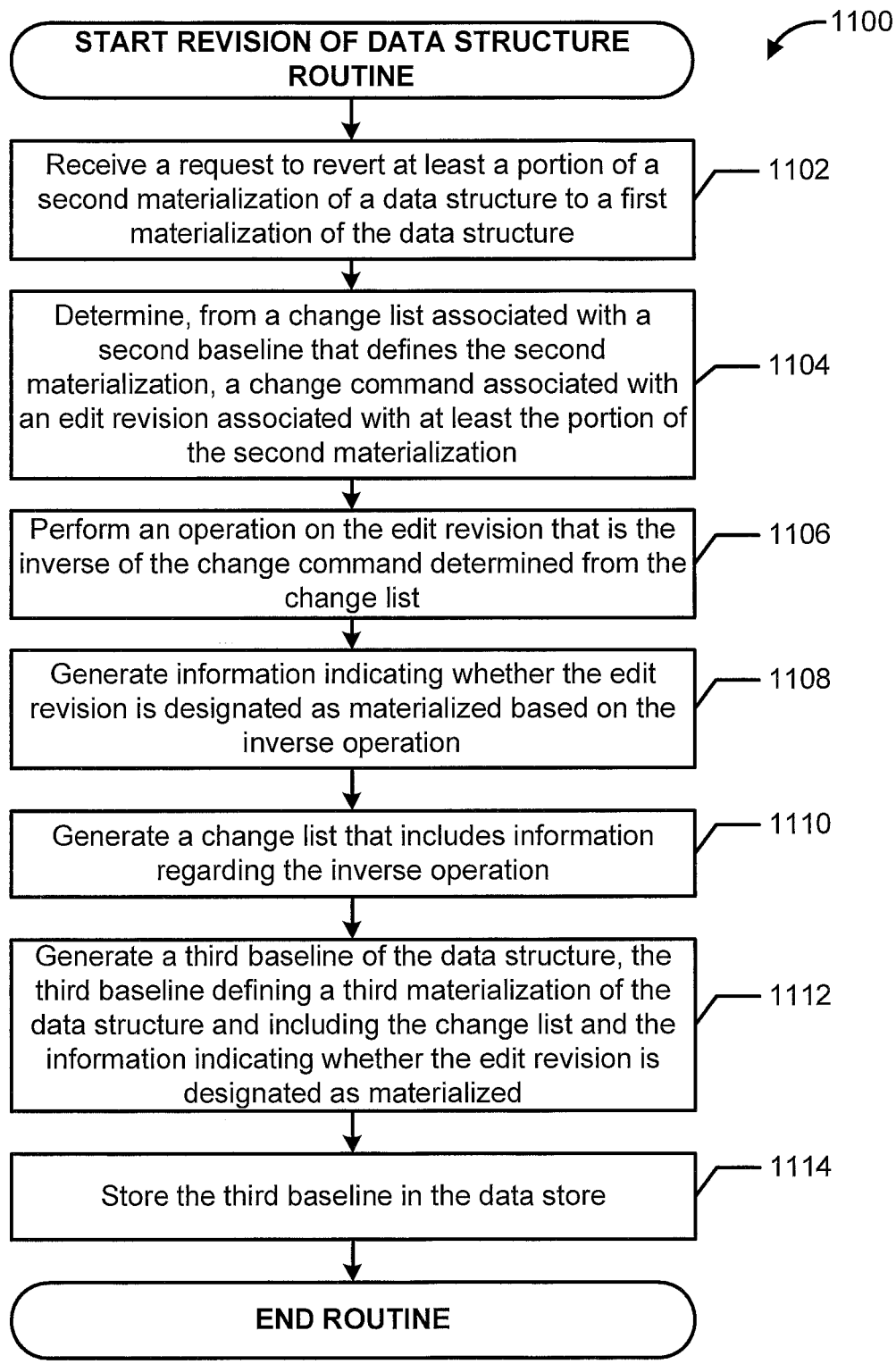
FIG. 11 is a flow diagram depicting an illustrative computer-implemented method that may be implemented by the computing device shown in FIG. 7 to selectively revert at least a portion of a baseline of a data structure to an earlier baseline.

FIG. 11 is a flow diagram depicting an illustrative computer-implemented method or routine 1100 for selectively editing or reverting at least a portion of a data structure to an earlier state, according to some embodiments. The routine 1100 may be implemented by a data structure managing service operating on a computing device (e.g., the data structure managing service 718 of the computing device 104 as described with reference to FIG. 7).

In block 1102, the data structure managing service 718 may receive a request to revert at least a portion of a second materialization of a data structure to a first materialization of the data structure, such as from a user computing device. In some embodiments, the data structure managing service 718 may generate a comparison of the first materialization of the data structure defined by a first baseline with the second materialization of the data structure defined by a second baseline. The data structure managing service 718 may then provide the comparison to the user computing device.

In block 1104, the data structure managing service 718 may determine, from a change list associated with the second baseline, an operation associated with an edit revision related to at least the portion of the data structure associated with the request received in the block 1102. In some embodiments, the data structure managing service 718 may determine the components (e.g., nodes, trees, edges, etc.) or the edit revisions of the data structure associated with the portion of second baseline identified in the request received in block 1102. The data structure managing service 718 may then determine change commands or change information stored in the second baseline associated with those components or edit revisions.

In block 1106, the data structure managing service 718 may perform an operation that is the inverse of the operation determined in block 1104. All change commands may be represented as an "add" change command, an "omit" change command, or a combination of "add" and "omit" change commands. Thus, as described, each change command may be guaranteed to be reversible by performing a corresponding inverse command. For example, the data structure managing service 718 may perform an "add" change command as the inverse of an "omit" change command. Specifically, because edit revisions are not typically removed from the shared data set (except, for example, as part of a prescheduled data purging routine), "adding" a edit revision that has been previously omitted may designate as materialized that edit revision as that edit revision was designated as non-materialized as part of omitting the edit revision. In another example, the data structure managing service 718 may perform an "omit" change command as the inverse of an "add" change command. In this example, the data structure managing service 718 may change the designation of the affected edit revision to "not materialized" from "materialized" for the reasons discussed above related to the shared data set. In yet another example, the data structure managing service 718 may perform both an "add" and an "omit" change command as the inverse of a "swap" change command. In this example, the "swap" change command may correspond to adding a new edit revision to have a desired value and omitting a preexisting edit revision. As such, the data structure managing service 718 may perform the inverse of the "swap" change command by adding the preexisting edit revision and omitting the new edit revision via changes in their designation as materialized or not materialized.

In block 1108, the data structure managing service 718 may generate information indicating whether the edit revision is designated as materialized based on performance of the inverse operation on the edit revision. The data structure managing service 718 may, in block 1110, generate a change list that includes information regarding the inverse operation.

In block 1112, the data structure managing service 718 may generate a third baseline of the data structure. In some embodiments, the third baseline may correspond to aspects of both the second baseline and the first baseline as a result of performing the partial inverse operations to undo the change from the first baseline to the second baseline. In some embodiments, the third baseline may include the change list generated in block 1110 and the information indicating whether the edit revision is designated as materialized in response to performance of the inverse operation as generated in block 1108.

The data structure managing service 718 may store the third baseline in the shared data set, in block 1114. The data structure managing service 718 may then cease performing the operations of the routine 1100.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computing system comprising:
   a memory configured to store processor-executable instructions; and
   a processor in communication with the memory and configured to execute the processor-executable instructions to perform operations comprising:
   obtaining a set of immutable edit revisions to a graph, wherein individual immutable edit revisions of the set of immutable edit revisions comprise a unique identifier, a field, and a value;
   storing the set of immutable edit revisions to the graph in a shared data set;
   generating a first pointer block comprising a first set of pointers, wherein each pointer in the first set of pointers points to an immutable edit revision in a first subset of the set of immutable edit revisions stored in the shared data set;
   generating, from the first set of pointers, a first baseline of the graph, wherein the first baseline defines a first materialization of the graph representing a state of the graph at a first point in time;
   receiving, from a computing device, a desired change to the first materialization of the graph;
   determining a change command based at least in part on the desired change to the first materialization of the graph;
   applying the change command to the first subset of immutable edit revisions stored in the shared data set to determine a second subset of the set of immutable edit revisions to the graph;
   generating, from the second subset of the set of immutable edit revisions, a second pointer block comprising a second set of pointers, wherein each pointer in the second set of pointers points to an immutable edit revision in the second subset of the set of immutable edit revisions;
   generating, from the second set of pointers, a second baseline of the graph, wherein the second baseline defines a second materialization of the graph representing a state of the graph at a second point in time, and wherein at least one immutable edit revision that was materialized with respect to the first materialization of the graph is not materialized with respect to the second materialization of the graph;
   determining, from the first baseline and the second baseline, a difference between the first materialization of the graph and the second materialization of the graph;
   generating, from the second baseline of the graph, user interface information comprising the second materialization of the graph and information related to the difference between the first materialization of the graph and the second materialization of the graph; and
   sending the user interface information to the computing device for presentation.

2. The computing system of claim 1, wherein:
   the set of immutable edit revisions is replicated across a set of distributed computing devices;
   obtaining the set of immutable edit revisions comprises receiving the set of immutable edit revisions from at least one of the set of distributed computing devices; and
   the first baseline and the second baseline are generated without synchronizing the set of immutable edit revisions with any of the set of distributed computing devices.

3. The computing system of claim 1, wherein an edit revision of the set of immutable edit revisions cannot be modified.

4. The computing system of claim 3, wherein each of the first baseline of the graph, the second baseline of the graph, the first pointer block, the second pointer block, the first set of pointers pointing to immutable edit revisions in the first subset of the set of immutable edit revisions, and the second set of pointers pointing to immutable edit revisions in second subset of the set of immutable edit revisions cannot be modified.

5. The computing system of claim 1, wherein the operations further comprise generating the first materialization of the graph from the first baseline of the graph, wherein the first materialization of the graph comprises a node having a property defined at least in part by the first subset of the set of immutable edit revisions.

6. The computing system of claim 5, wherein the operations further comprise:
   generating the second materialization of the graph from the second baseline of the graph and not from the first baseline of the graph, wherein the second materialization of the graph comprises a node having a property defined at least in part by the second subset of the set of immutable edit revisions,
   wherein the property of the node of the first materialization of the graph is distinct from the property of the node of the second materialization of the graph.

7. The computing system of claim 1, wherein the operations further comprise receiving, from the computing device, a request for a comparison of the first materialization of the graph and the second materialization of the graph,
   wherein sending the user interface information to the computing device for presentation comprises sending the user interface information to the computing device for presentation responsive to the request for the comparison.

8. A computer-implemented method comprising:
- obtaining a first set of edit revisions to a data structure, wherein individual edit revisions of the first set of edit revisions comprise a unique identifier, a field, and a value;
- storing the first set of edit revisions to the data structure in a shared data set;
- generating, from a first set of pointers, a first baseline of a data structure, wherein each pointer in the first set of pointers points to an edit revision in a first subset of edit revisions stored in the shared data set, and wherein the first baseline defines a first materialization of the data structure representing a state of the data structure at a first point in time;
- receiving a request to change the first materialization of the data structure;
- determining a second set of edit revisions to the data structure based at least in part on the request to change the first materialization of the data structure and the first set of edit revisions;
- generating, from a second set of pointers, a second baseline of the data structure, wherein each pointer in the second set of pointers points to an edit revision in the second set of edit revisions, wherein the second baseline of the data structure defines a second materialization of the data structure representing a state of the data structure at a second point in time and comprises a set of pointers to the second set of edit revisions, and wherein at least one edit revision that was not materialized with respect to the first materialization of the data structure is materialized with respect to the second materialization of the data structure;
- determining, from the first baseline and the second baseline, a difference between the first materialization of the data structure and the second materialization of the data structure;
- generating, from the second baseline of the data structure, user interface information comprising the second materialization of the data structure and information related to the difference between the first materialization of the data structure and the second materialization of the data structure; and
- sending the user interface information to a computing device for presentation responsive to the request to change the first materialization of the data structure.

9. The computer-implemented method of claim 8, wherein the computer-implemented method further comprises:
- generating the first materialization of the data structure from the first baseline of the data structure; and
- providing the first materialization of the data structure to the computing device,
- wherein receiving the request to change the first materialization of the data structure comprises receiving, from the computing device, the request to change the first materialization of the data structure.

10. The computer-implemented method of claim 9, further comprising generating the second materialization of the data structure from the second baseline of the data structure and not from the first baseline of the data structure.

11. The computer-implemented method of claim 8, wherein determining the second set of edit revisions based at least in part on the request and the first set of edit revisions comprises determining that the request corresponds to adding the at least one edit revision to the first set of edit revisions.

12. The computer-implemented method of claim 11, wherein the set of pointers to the second set of edit revisions comprises a pointer to the at least one edit revision.

13. The computer-implemented method of claim 12, further comprising:
- determining that the at least one edit revision is not stored in the shared data set; and
- storing the at least one edit revision in the shared data set.

14. The computer-implemented method of claim 8, wherein determining the second set of edit revisions based at least in part on the request and the first set of edit revisions comprises determining that the request corresponds to omitting an edit revision from the first set of edit revisions.

15. The computer-implemented method of claim 14, further comprising omitting a pointer to the edit revision from the first set of pointers, wherein the edit revision is not removed from the shared data set.

16. The computer-implemented method of claim 8, wherein determining a second set of edit revisions based at least in part on the request and the first set of edit revisions comprises:
- determining that the request corresponds to swapping a preexisting edit revision of the first set of edit revisions with a new edit revision having a second value, wherein the preexisting edit revision has a first value; and
- creating a new edit revision having the second value.

17. The computer-implemented method of claim 16, further comprising:
- omitting a pointer to the preexisting edit revision from the first set of pointers; and
- adding a pointer to the new edit revision to the first set of pointers.

18. A non-transitory, computer-readable medium having stored thereon computer-executable software instructions configured to cause a processor of a first computing device to perform operations comprising:
- obtaining a set of immutable edit revisions to a graph, wherein individual immutable edit revisions of the set of immutable edit revisions comprise a unique identifier, a field, and a value;
- storing the set of immutable edit revisions to the graph in a shared data set;
- generating, from a first set of immutable edit revisions to the graph, a first baseline of the graph, wherein the first baseline defines a first materialization of the graph representing a state of the graph at a first point in time;
- determining a first change to the first materialization of the graph;
- determining a second set of immutable edit revisions to the graph stored in the shared data set based at least in part on the first change and the first set of immutable edit revisions;
- generating, from the second set of immutable edit revisions, a second baseline of the graph, wherein the second baseline defines a second materialization of the graph representing a state of the graph at a second point in time, and wherein at least one edit revision that is materialized in one of the first or second materialization is not materialized in the other of the first or second materialization;
- determining, from the first baseline and the second baseline, a difference between the first materialization of the graph and the second materialization of the graph;
- generating, from the second baseline of the graph, user interface information comprising the second materialization of the graph and information related to the difference between the first materialization of the graph and the second materialization of the graph; and sending the user interface information to a second computing device for presentation.

19. The non-transitory, computer-readable medium of claim 18, wherein the operations further comprise:

determining a second change to the first materialization of the graph;

determining a third set of immutable edit revisions to the graph that are stored in the shared data set based at least in part on the second change and the first set of immutable edit revisions; and generating, from the third set of immutable edit revisions, a third baseline, wherein the third baseline defines a third materialization of the graph representing a state of the graph at a third point in time.

20. The non-transitory, computer-readable medium of claim 19, wherein the operations further comprise storing the first set of immutable edit revisions, the second set of immutable edit revisions, and the third set of immutable edit revisions in a shared data set, wherein immutable edit revisions stored in the shared data set cannot be modified.

21. The non-transitory, computer-readable medium of claim 19, wherein the operations further comprise:

generating the second materialization of the graph from the second baseline of the graph and not from the first baseline of the graph;

providing the second materialization of the graph to the second computing device;

generating the third materialization of the graph from the third baseline of the graph and not from the first baseline of the graph or the second baseline of the graph; and providing the third materialization of the graph to a third computing device.

22. The non-transitory, computer-readable medium of claim 21, wherein the second materialization of the graph is provided to the second computing device at a first time that is substantially similar to a second time at which the third materialization of the graph is provided to the third computing device.

* * * * *